(12) United States Patent
Crawford et al.

(10) Patent No.: US 10,202,499 B2
(45) Date of Patent: Feb. 12, 2019

(54) SURFACE INFUSION OF FLEXIBLE CELLULAR FOAMS WITH NOVEL LIQUID GEL MIXTURE

(71) Applicant: Peterson Chemical Technology, LLC, West Lake Hills, TX (US)

(72) Inventors: Mark L. Crawford, Rudy, AR (US); Bruce W. Peterson, Fort Smith, AR (US); Matthew D. McKnight, Fort Smith, AR (US); Jonathon M. Walker, Van Buren, AR (US)

(73) Assignee: PETERSON CHEMICAL TECHNOLOGY, LLC, West Lake Hills, TX (US)

( * ) Notice: Subject to any disclaimer, the term of this patent is extended or adjusted under 35 U.S.C. 154(b) by 172 days.

(21) Appl. No.: 15/299,924

(22) Filed: Oct. 21, 2016

(65) Prior Publication Data
US 2017/0037215 A1 Feb. 9, 2017

Related U.S. Application Data

(60) Division of application No. 14/135,143, filed on Dec. 19, 2013, now abandoned, which is a
(Continued)

(51) Int. Cl.
| | |
|---|---|
| *C08J 9/36* | (2006.01) |
| *C08K 5/03* | (2006.01) |
| *A47G 9/10* | (2006.01) |
| *B05D 3/02* | (2006.01) |
| *C08K 3/04* | (2006.01) |
| *C08K 5/01* | (2006.01) |
| *A47C 21/04* | (2006.01) |

(Continued)

(52) U.S. Cl.
CPC ............... *C08J 9/365* (2013.01); *A47C 7/18* (2013.01); *A47C 7/38* (2013.01); *A47C 7/40* (2013.01); *A47C 7/54* (2013.01); *A47C 21/046* (2013.01); *A47C 27/088* (2013.01); *A47C 27/15* (2013.01); *A47C 31/00* (2013.01); *A47G 9/02* (2013.01); *A47G 9/10* (2013.01); *A61G 5/1091* (2016.11); *A61G 7/065* (2013.01); *B05D 1/02* (2013.01); *B05D 1/28* (2013.01); *B05D 1/34* (2013.01); *B05D 3/007* (2013.01); *B05D 3/0254* (2013.01); *C08J 9/42* (2013.01); *C08K 3/04* (2013.01); *C08K 5/01* (2013.01); *C08K 5/03* (2013.01); *C09D 5/26* (2013.01); *C09D 153/00* (2013.01); *A01K 1/0353* (2013.01); *A47G 2009/1018* (2013.01); *C08J 2325/08* (2013.01); *C08K 2201/001* (2013.01); *Y10T 428/249991* (2015.04); *Y10T 428/249992* (2015.04); *Y10T 428/25* (2015.01); *Y10T 428/256* (2015.01); *Y10T 428/31551* (2015.04); *Y10T 428/31786* (2015.04); *Y10T 428/31826* (2015.04); *Y10T 428/31938* (2015.04)

(58) Field of Classification Search
CPC .......... A01K 1/0353; A47C 7/18; A47C 7/38; A47C 7/40; A47C 7/54; A47C 21/046; A47C 27/088; A47C 27/15; A47C 31/00; A47G 9/02; A47G 9/10; A47G 9/1018; A61G 5/1091; A61G 7/065; B05D 1/02; B05D 1/28; B05D 1/34; B05D 3/007; B05D 3/0254; C08J 9/365; C08J 9/42; C08J 2325/08; C08K 3/04; C08K 5/01; C08K 5/03; C08K 2201/001; C09D 5/26; C09D 153/00; Y10T 428/249991; Y10T 428/249992; Y10T 428/25; Y10T 428/256; Y10T 428/31551; Y10T 428/31786; Y10T 428/31826; Y10T 428/31938
See application file for complete search history.

(56) References Cited

U.S. PATENT DOCUMENTS

| | | |
|---|---|---|
| 3,404,061 A | 10/1968 | Shane et al. |
| 3,574,644 A | 4/1971 | Olstowski et al. |

(Continued)

FOREIGN PATENT DOCUMENTS

| | | |
|---|---|---|
| EP | 0924278 A1 | 6/1999 |
| EP | 1063270 A2 | 12/2000 |
| JP | 2001-354911 A | 12/2001 |

OTHER PUBLICATIONS

Int'l Search Report & Written Opinion in PCT/US2013/076870, dated Apr. 22, 2014.
Int'l Search Report in EP13868762.9 dated May 19, 2016.

*Primary Examiner* — John M Cooney
(74) *Attorney, Agent, or Firm* — Mossman, Kumar & Tyler, PC

(57) ABSTRACT

Compositions and methods for making a novel liquid gel mixture comprising at least one flexible polymer carrier, parachlorobenzotrifluoride, optional thermally-conductive materials, and optional performance-enhancing additives; using the liquid gel mixture for making surface-infused layers on layering substrates; and using combinations of surface-infused gel layer and layering substrate in cushioning foams and mattresses. Layering substrates are surface-infused with a liquid gel mixture and may be compressed to increase the penetration depth of liquid gel mixture into the substrate layer surface. This compositions may be used in mattresses, mattress topper pads, pillows, bedding products, furniture upholstery, pet beds, medical cushioning foams, seat cushions and backs, automotive foam, sports cushioning, transportation cushioning, headrests, arm rests, personal protective equipment, toys, and the like.

20 Claims, 13 Drawing Sheets

Related U.S. Application Data continuation-in-part of application No. 13/932,492, filed on Jul. 1, 2013, now Pat. No. 8,933,140.

(60) Provisional application No. 61/746,346, filed on Dec. 27, 2012, provisional application No. 61/667,810, filed on Jul. 3, 2012.

(51) Int. Cl.

| | | |
|---|---|---|
| *A47C 27/15* | (2006.01) | |
| *A61G 5/10* | (2006.01) | |
| *A47C 7/18* | (2006.01) | |
| *A47C 7/38* | (2006.01) | |
| *A47C 7/40* | (2006.01) | |
| *A47C 7/54* | (2006.01) | |
| *A47C 27/08* | (2006.01) | |
| *A47C 31/00* | (2006.01) | |
| *A47G 9/02* | (2006.01) | |
| *A61G 7/065* | (2006.01) | |
| *B05D 1/02* | (2006.01) | |
| *B05D 1/28* | (2006.01) | |
| *B05D 1/34* | (2006.01) | |
| *B05D 3/00* | (2006.01) | |
| *C08J 9/42* | (2006.01) | |
| *C09D 5/26* | (2006.01) | |
| *C09D 153/00* | (2006.01) | |
| *A01K 1/035* | (2006.01) | |

(56) References Cited

U.S. PATENT DOCUMENTS

| | | |
|---|---|---|
| 4,943,478 A | 7/1990 | McCullough, Jr. et al. |
| 5,336,708 A | 8/1994 | Chen |
| 5,760,117 A | 6/1998 | Chen |
| 6,395,199 B1 | 5/2002 | Krassowski et al. |
| 6,416,815 B2 | 7/2002 | Greinke et al. |
| 6,503,626 B1 | 1/2003 | Norley et al. |
| 6,987,142 B2 | 1/2006 | St. Clair et al. |
| 7,718,557 B2 | 5/2010 | Mikaelian |
| 7,977,608 B2 | 7/2011 | Diemer et al. |
| 2003/0109908 A1 | 6/2003 | Lachenbruch et al. |
| 2003/0176574 A1 | 9/2003 | St. Clair et al. |
| 2004/0068036 A1 | 4/2004 | Halladay et al. |
| 2004/0118553 A1 | 6/2004 | Krassowski et al. |
| 2007/0264462 A1* | 11/2007 | Covelli ............ B32B 5/22 428/43 |
| 2007/0290542 A1 | 12/2007 | Wada |
| 2009/0142551 A1 | 6/2009 | Fox et al. |
| 2009/0206067 A1 | 8/2009 | Foss |
| 2010/0326598 A1 | 12/2010 | Atwater |
| 2011/0140053 A1 | 6/2011 | Tsonev et al. |
| 2011/0283458 A1 | 11/2011 | Gillette et al. |
| 2012/0190776 A1 | 7/2012 | Houston et al. |
| 2012/0193572 A1* | 8/2012 | MacKay ............ A47C 7/746 252/78.1 |
| 2012/0244312 A1 | 9/2012 | Pearce et al. |
| 2012/0276339 A1 | 11/2012 | Pearce et al. |
| 2013/0225020 A1 | 8/2013 | Flood et al. |
| 2014/0023853 A1* | 1/2014 | Gueret ............ B01D 53/02 428/323 |

\* cited by examiner

Roll Laminator

Roll Laminator with Downstream Compression

SURFACE INFUSION OF FLEXIBLE CELLULAR FOAMS WITH NOVEL LIQUID GEL MIXTURE

CROSS-REFERENCE TO RELATED APPLICATION

This application is a divisional of U.S. patent application Ser. No. 14/135,143 filed Dec. 19, 2013, now abandoned, which in turn claims the benefit of U.S. Provisional Patent Application No. 61/746,346 filed Dec. 27, 2012, and is also a continuation-in-part application of U.S. patent application Ser. No. 13/932,492 filed Jul. 1, 2013, now U.S. Pat. No. 8,933,140 issued Jan. 13, 2015, and which claims benefit of Provisional Patent Application No. 61/667,810, filed Jul. 3, 2012, all of which are incorporated herein by reference in their entirety.

TECHNICAL FIELD

This invention relates to methods for making and using at least one surface-infused gel layer located on, under, or in cushioning foams and mattresses. This invention more specifically relates to mattresses, mattress topper pads, pillows, bedding products, furniture upholstery, pet beds, medical cushioning foams, seat cushions and backs, automotive foam, sports cushioning, transportation cushioning, headrests, arm rests, personal protective equipment, toys, and the like.

TECHNICAL BACKGROUND

Foams such as open-celled polyurethane flexible foams, partially open-celled polyurethane flexible foams, latex foams and melamine foams typically have low thermal conductivities in the range of 0.02-0.04 W/m ° K. Materials with low thermal conductivities typically function as insulators, such as rigid polyurethane foam insulation board or expanded polystyrene insulation boards used for insulating purposes.

Heat transfer consists of a combination of conduction, convection and radiation. In a cushion or mattress, heat transfer by radiation is not very large. Instead, heat transfer by conduction and convection are the primary paths for moving heat in a cushion or mattress. As a person sleeps on a mattress, the compressed foam underneath the body has reduced air flow paths, and the primary mode in the region below the body is conduction.

Heat is conducted from the body, through the compressed foam, into one or more foam layers and dispersed through the foam layers into cushion or mattress regions where the foam is not compressed as much, which allows natural convection to occur more readily for removal of heat from the mattress.

Chen disclosed in U.S. Pat. No. 5,760,117 gelatinous composition and articles where the articles from composites, either in non-sticking oriented or non-oriented configuration, including GMG, MGM, $MG_1G_2M$, $M_1M_2G_1G_2$, $M_2M_1G_1G_2$, $G_1MG_1G_2$, $MG_1G_2$, $G_1G_2M$, $G_2G_1M$, $GM_1M_2G$, $G_1M_1G_2M_2M_1$, $M_1GM_2GM_3GM_4$, etc., where G=gel and M=material. The subscripts 1, 2, 3, 4, etc., are different and are represented by n which is a positive number, when n is a subscript of M, n may be the same or different material and when n is a subscript of G, n can be the same or different rigidity, non-sticking oriented or non-oriented gel or the same or different gel material composition. The material (M) suitable for forming composite articles with the gelatinous elastomer compositions can include foam, plastic, fabric, metal, concrete, wood, wire screen, refractory material, glass, synthetic resin, synthetic fibers, and the like. The non-sticking oriented or non-oriented gel compositions of Chen's disclosure can be casted unto various substrates, such as open cell materials, metals, ceramics, glasses, and plastics, etc.; the molten gel composition is deformed as it is being cooled. Such deformation before being cooled may force molten gel into open-celled materials, such as open-celled polyurethane foam, and open up pathways for air migration through the gel layer. Chen does not mention porous gel layer/flexible cellular foam combination.

St. Clair disclosed in U.S. Pat. No. 6,987,142 a pressure sensitive adhesive composition comprising 100 parts by weight of at least one hydrogenated block copolymer, about 25 to about 300 parts by weight of a compatible styrene/isoprene unhydrogenated block copolymer, about 25 to about 300 parts by weight of at least one tackifying resin and about zero to about 200 parts by weight of an extending oil, wherein said hydrogenated block copolymer has at least one polymer block A and at least one polymer block B, and wherein: a. prior to hydrogenation each A block is a mono alkenyl arene homopolymer block and each B block is a controlled distribution copolymer block of at least one conjugated diene and at least one mono alkenyl arene; b. subsequent to hydrogenation about 0-10% of the arene double bonds have been reduced, and at least about 90% of the conjugated diene double bonds have been reduced; c. each A block having a number average molecular weight between about 3,000 and about 60,000 and each B block having a number average molecular weight between about 20,000 and about 300,000; d. each B block comprises terminal regions adjacent to the A blocks that are rich in conjugated diene units and one or more regions not adjacent to the A blocks that are rich in mono alkenyl arene units; e. the total amount of mono alkenyl arene in the hydrogenated block copolymer is about 20 percent weight to about 80 percent weight; and f. the weight percent of mono alkenyl arene in each B block is between about 10 percent and about 75 percent. Also, St. Clair discloses a solvent-based pressure sensitive adhesive composition wherein the solvent is an aromatic hydrocarbon solvent and a compatible solvent is selected from a group consisting of aromatic hydrocarbon solvents, aliphatic hydrocarbon solvents, polar solvents and mixtures thereof. Parachlorobenzotrifluoride (PCBTF) is mentioned in example 9 as an exempt VOC solvent that can be used for replacing at least a portion of toluene in solvating SEBS. However, St. Clair only concerns a pressure sensitive adhesive and does not relate to any cushion foams or mattresses.

There remains a need to improve infusion of flexible foams with a gel, and in particular to improve the thermal conductivity of flexible foams, particularly open-celled polyether polyurethane foam, partially open-celled polyether polyurethane foam, reticulated polyurethane foam, high-resiliency polyether polyurethane foam, open-celled viscoelastic polyether polyurethane foam, partially open-celled viscoelastic polyether polyurethane foam, open-celled polyester polyurethane foam, partially open-celled polyester polyurethane foam, open-celled polyester foam, partially open-celled polyester foam, latex foam, melamine foam, and combinations thereof.

SUMMARY

There is provided, in one non-limiting form, compositions and methods of producing surface-infused gel layers comprised of at least one flexible polymeric carrier, parachlorobenzotrifluoride, optional highly thermally-conductive materials having thermal conductivities in the range of about 100 W/(m-° K) to about 3500 W/(m-° K), and optional performance-enhancing additives, whereby the flexible polymeric carrier is solvated in parachlorobenzotrifluoride solvent to produce a liquid gel mixture suitable for surface infusion or coating of a layering substrate.

Liquid gel mixtures may include at least one flexible polymeric carrier solvated in parachlorobenzotrifluoride (PCBTF). Optionally, the liquid gel mixture has an absence of toluene.

Suitable layering substrates include flexible cellular foams such as, but not limited to, open-celled polyether polyurethane foam, partially open-celled polyether polyurethane foam, reticulated polyurethane foam, high-resiliency polyether polyurethane foam, open-celled viscoelastic polyether polyurethane foam, partially open-celled viscoelastic polyether polyurethane foam, open-celled polyester polyurethane foam, partially open-celled polyester polyurethane foam, open-celled polyester foam, partially open-celled polyester foam, latex foam, melamine foam, and combinations thereof.

In one non-limiting embodiment, the disclosed solvent useful for making liquid gel mixtures comprises parachlorobenzotrifluoride (PCBTF). PCBTF is preferably employed to solvate or dissolve the flexible polymeric carrier, either prior to or after adding any highly thermally-conductive materials, useful performance-enhancing additives, or combinations thereof. PCBTF is particularly useful for dissolving plasticized tri-block copolymer resins.

In a different non-limiting embodiment, the surface-infused gel layer is produced by making a liquid using a method employing the following steps, although not necessarily in this order: making a liquid mixture by solvating the flexible polymeric carrier in PCBTF solvent, optionally introducing a highly thermally-conductive material in the flexible polymeric carrier, optionally introducing performance-enhancing additives in the flexible polymeric carrier, infusing at least a portion of the liquid gel mixture into the layering substrate to give a product having a surface-infused gel layer thereon; optionally compressing the product of layering substrate and surface-infused gel liquid mixture; and at least partially removing the parachlorobenzotrifluoride solvent.

Articles may be manufactured from the combinations of at least one surface-infused gel layer and at least one layering substrate including, but not necessarily limited to, mattresses, mattress topper pads, pillows, bedding products, pet beds, medical cushioning foams (e.g. wheelchair pads, medical bedding and gurney pads), pillows, seat cushions, seat backs, head rests, armrests, cushion for sports equipment, upholstered products, personal protective equipment, toys and combinations thereof.

It will be appreciated that FIGS. 1-19 and 24-27 are schematic and that the various elements are not necessarily to scale or proportion, and that many details have been removed or simplified for clarity, and thus the invention is not necessarily limited to the embodiments depicted in the Figures.

Before the invention is explained in detail, it is to be understood that the invention is not limited in its application to the details of construction and the arrangements of the components set forth in the following description or illustrated in drawings. The invention is capable of other embodiments and of being practiced or being carried out in various ways. Also, it is understood that the phraseology and terminology used herein are for the purpose of description and should not be regarded as limiting.

DETAILED DESCRIPTION

It is useful to develop improved heat transfer in a cushion or mattress to provide cooler and more comfortable sleep by using at least one surface-infused gel layer located on, under, or within cushion foam or mattress, wherein the surface-infused gel layer is produced from a liquid gel mixture comprising a flexible polymeric carrier, parachlorobenzotrifluoride (PCBTF), optional thermally-conductive materials, and optional performance-enhancing additives.

Heat transfer consists of a combination of conduction, convection and radiation. In a cushion or mattress, heat transfer by radiation is not very large. Instead, heat transfer by conduction and convection are the primary paths for moving heat in a cushion or mattress. As a person sleeps on a mattress, the compressed foam underneath the body has reduced air flow paths, and the primary mode of heat flow in the region below the body is conduction. Heat is conducted from the body through the compressed foam, into at least one surface-infused gel layer, and dispersed through said surface-infused gel layers into cushion or mattress regions where the foam is not compressed as much, which allows natural convection to occur more readily to remove heat from the mattress.

Figure 1:
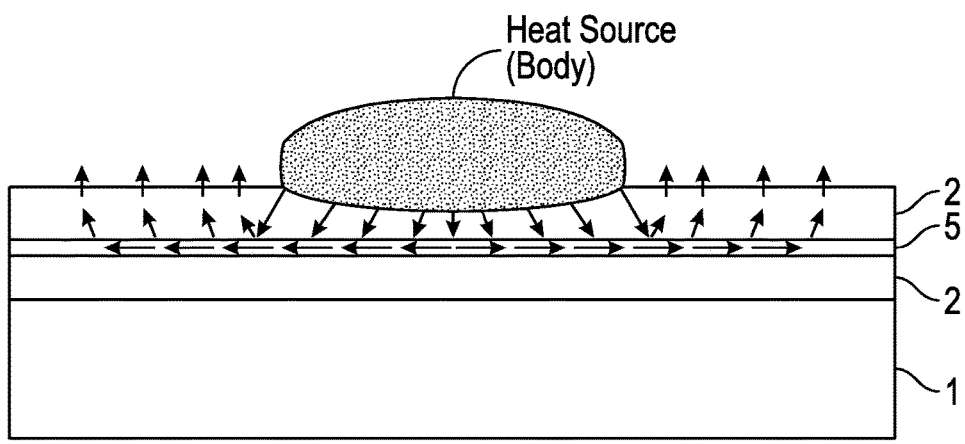
FIG. 1 is an illustration of a possible heat transfer pathway in a mattress cross section.

Enhanced heat transfer occurs as heat migrates from a warm area in foam, enters a surface-infused gel layer, and disperses to cooler areas within the cushion foam or mattress. A surface-infused gel layer allows heat to transfer at a greater rate than if the heat migrates through flexible cellular foam alone, which helps to lower the surface temperature of the foam in contact with a person. FIG. 1 is a general representation of a heat transfer path when a person sleeps on a mattress with a surface-infused gel layer located below the first layer of foam. It should be noted that FIG. 1 does not represent all the possible combinations of surface-infused gel layers and foams. As will be discussed, FIGS. 2-11 provide a few of the many other possible configurations that are possible.

Surface-infused gel layers are defined in one non-limiting embodiment as being comprised of at least one flexible polymeric carrier, parachlorobenzotrifluoride, optional highly thermally-conductive materials having thermal conductivities in the range of about 100 W/(m-° K) to about 3500 W/(m-° K), and optional performance-enhancing additives, whereby the flexible polymeric carrier is solvated in parachlorobenzotri-fluoride solvent to produce a liquid gel mixture suitable for surface infusion or coating of a layering substrate. In one non-limiting embodiment, "solvated" is defined as completely dissolved.

Suitable layering substrates include flexible cellular foams such as, but not limited to, open-celled polyether polyurethane foam, partially open-celled polyether polyurethane foam, reticulated polyurethane foam, high-resiliency polyether polyurethane foam, open-celled viscoelastic polyether polyurethane foam, partially open-celled viscoelastic polyether polyurethane foam, open-celled polyester polyurethane foam, partially open-celled polyester polyurethane foam, open-celled polyester foam, partially open-celled polyester foam, latex foam, melamine foam, and combinations thereof.

Flexible polymeric carriers are comprised of, but not limited to, gelatinous A-B-A tri-block copolymer elastomers, thermoplastic polyurethane elastomers, thermoplastic polyester elastomers, latex elastomers, neoprene elastomers, and combinations thereof. A-B-A tri-block copolymer resins used for making gelatinous A-B-A tri-block copolymer elastomers include, but are not necessarily limited to, (SEBS) styrene-ethylene-butylene-styrene block copolymers, (SEPS) styrene-ethylene-propylene-styrene block copolymers, (SEEPS) styrene-ethylene-ethylene-propylene-styrene block copolymers, (SBS) styrene-butadiene-styrene block copolymers, (SIS) styrene-isoprene-styrene block copolymers and the like. The term "flexible" in flexible polymeric carrier is defined to mean that the polymers and copolymers have glass transition temperatures less than 25° C. and are suitable for the production of surface-infused gel layers on flexible cellular foams as described and defined herein. The term "Glass transition temperature" is defined to mean the temperature at which an amorphous solid becomes soft upon heating or brittle upon cooling. For example, flexible polymeric carriers from SEBS or latex have a glass transition temperatures of about −42° C. and −65° C., respectively.

Optional highly thermally-conductive materials are comprised of, but not limited to, materials such as natural flake graphite, powder graphite, graphene, synthetic graphite, graphite-based particulates, aluminum nitride, diamond, diamond crystal powder, natural diamond crystal powder, type IIa diamond powder, carbanado "Black Diamond", silicon carbide, boron nitride, metal flakes such as aluminum and copper, and other materials with thermal conductivities in the range of about 100 W/(m-° K) independently to about 3500 W/(m-° K) in solid form; alternatively from about 150 W/(m-° K) to about 1000 W/(m-° K). The surface-infused gel layer may contain at least one highly thermally-conductive material up to about 95% by weight based on the surface-infused gel layer weight after solvent loss, and alternatively up to about 75% by weight of the surface-infused gel layer weight after solvent loss, and another non-restrictive version up to about 50% by weight of the surface-infused gel layer weight after solvent loss. "Solvent loss" simply means the remaining weight after removal of substantially all of the solvent by evaporation, absorption, or other technique. The highly thermally-conductive materials may have a size ranging from about 0.1 microns independently to about 3000 microns; alternatively, they may have a size ranging from about 1 independently to about 1000 microns, or even on a nanometer scale, defined as 1,000 nm or less. The word "independently" as used herein with respect to the range for a parameter means that any lower threshold and any upper threshold for any range may be recombined to give a suitable alternative range for that parameter.

It will also be appreciated that the term "surface-infused" may encompass the case where the layering substrate is entirely infused with at least one cured flexible gel polymeric carrier layer, since such layer is infused from at least one surface, and the at least one cured flexible gel polymeric carrier layer may thus be coextensive with the layering substrate.

Plasticizers added to tri-block copolymers, suitable for making acceptable gelatinous tri-block copolymer elastomers are well known in the art, include, but are not necessarily limited to, rubber processing oils such as paraffinic petroleum oils, naphthenic petroleum oils, highly-refined aromatic-free paraffinic oils and naphthenic food and technical grade white petroleum mineral oils; synthetic oils; natural oils; and polyols made from natural oils and natural polyols. Synthetic oils are high viscosity oligomers such as non-olefins, isoparaffins, paraffins, aryl and/or alkyl phosphate esters, aryl and/or alkyl phosphite esters, polyols, and glycols. Many such oils are known and commercially available. Examples of various commercially available oils include, but are not necessarily limited to, PAROL® and TUFFLO® oils. Natural oils such as, but not limited to, canola oil, safflower oil, sunflower oil, soybean oil, and/or castor oils may be used. Natural oil-based polyols are biologically-based polyols such as, but not limited to, soybean-based and/or castor bean polyols. The plasticizer constitutes about 1 independently to about 1,400 pph (parts per hundred parts of A-B-A tri-block copolymer resin), alternatively about 100 independently to about 1200 pph (parts per hundred parts of A-B-A tri-block copolymer resin) in a gel, and alternatively about 300 independently to about 1000 pph (parts per hundred parts of A-B-A tri-block copolymer resin) in a liquid gel mixture.

In one embodiment, the disclosed solvent useful for making liquid gel mixtures comprises parachlorobenzotrifluoride (PCBTF). PCBTF is suitably employed to solvate the flexible polymeric carrier, either prior to or after optionally adding any highly thermally-conductive materials, performance-enhancing additives, or combinations thereof. PCBTF is particularly useful for dissolving plasticized A-B-A tri-block copolymer resins. In the liquid gel mixture, PCBTF is about 1% independently to about 99% by weight in the gel liquid mixture. Alternatively, PCBTF is about 5% independently to about 75% by weight in the gel liquid mixture.

PCBTF is classified as an exempt volatile organic compound (VOC) in all 50 states in the United States and also in Canada. VOCs are organic compounds that have sufficient vapor pressures to vaporize and enter the atmosphere under normal conditions. For the purposes of this disclosure, exempt VOCs as used herein refers to those compounds deemed to be exempt according to 40 CFR § 51.100(s) as of the date of filing. It is thus desirable to use only exempt VOCs in one non-limiting embodiment herein.

PCBTF is not classified as a hazardous air pollutant by the U.S. Environmental Protection Agency as of the date of filing. PCBTF has a boiling point of 282° F. (139° C.) and closed cup flash point of 109° F. (42.8° C.). Toluene can dissolve A-B-A tri-block copolymers. However, toluene is classified as a volatile organic compound (VOC) and is classified as a hazardous air pollutant by the U.S. Environmental Protection Agency, as such an air permit is required for emission. Toluene has a boiling point of 232° F. (111° C.) and closed cup flash point of 40° F. (4.4° C.). Since PCBTF has a higher flashpoint, it is considered to be a safer solvent alternative relative to toluene. In one non-limiting embodiment, the compositions and methods herein have an absence of toluene.

In gel liquid mixtures containing microencapsulated phase change materials (MPCM), PCBTF is a preferred solvent over toluene because PCBTF does not extract the core material from microencapsulated phase change materials as much as toluene solvent does. Extraction tests were performed by mixing 10 grams MPCM and 30 grams of either PCBTF or toluene at 25° C. for 7 days. The solvent portion was separated, and a gravimetric test was performed by placing the separated solvent in a convection oven at 110° C. for 45 minutes. Since the boiling point of n-octadecane (MPCM wax core material) is 600° F. (316° C.), the solvent evaporated and left the n-octadecane as a residue. The residue for the PCBTF and toluene solvents was 0.13% and 6.97% by weight, respectively. Toluene has a detrimental effect on MPCM because swells the MPCM encapsulate coating and releases contained n-octadecane.

Additional exempt VOC solvents that may be optionally used in combination with PCBTF include, but are not limited to, tert-butyl acetate, dimethyl carbonate, propylene carbonate, and combinations thereof. These solvents can modify the liquid viscosity and evaporation properties if desired.

In one non-limiting embodiment, other solvents may be employed that are compatible with PCBTF, including, but not necessarily limited to non-exempt VOC solvents and exempt VOC solvents. In a different non-restrictive version, there is an absence of VOC solvents in the methods and compositions described herein.

The surface-infused gel layer may also contain useful amounts of performance-enhancing additives such as stabilizers, antioxidants, antistatic agents, antimicrobial agents, de-tackifiers (including, but not necessarily limited to, melamine, calcium stearate, calcium carbonate, and talc), ultraviolet stabilizers, phase change materials, microencapsulated phase change materials, surface tension modifiers such as silicone surfactants, emulsifying agents, and/or other surfactants, solid flame retardants such as expandable graphite and ammonium polyphosphate, liquid flame retardants, grafting polyols, compatible hydroxyl-containing chemicals which are completely saturated or unsaturated in one or more sites, solid or liquid fillers, anti-blocking agents, colorants such as inorganic pigments, carbon black, organic colorants or dyes, reactive organic colorants or dyes, heat-responsive colorants, heat-responsive pigments, heat-responsive dyes, pH-responsive colorants, pH-responsive pigments, pH-responsive dyes and combinations thereof, fragrances, and viscosity-modifiers such as fumed silica and clays, and other polymers in minor amounts and the like to an extent not affecting or substantially decreasing the desired properties of the surface-infused gel layer.

Addition of phase change materials to the liquid gel mixture used for producing surface-infused gel layers allows the construction composite to store or release energy, which is higher than heat absorbed or released by heat capacity of the non-thermally enhanced construction. Heat is stored if the solid phase change material changes to a liquid, and heat is released when the liquid phase change material changes to a solid. The melting point temperature is usually chosen to be in the 20° C. to 35° C. range to match the human comfort zone. Once the solid phase change material melts completely, all of the latent heat is used, and the phase change material must be cooled below its melting point to solidify the phase change material and regenerate for the next melt cycle. Suitable phase change materials have a solid/liquid phase transition temperature from −10° F. to 220° F. (about −23° C. to about 104° C.). In another non-limiting version, the phase change solid/liquid phase transition temperature is from 68° F. to 95° F. (about 20° C. to about 35° C.).

In one non-limiting embodiment, the liquid gel mixture used to produce a surface-infused gel layer may contain phase change materials in the range of about 5% independently to about 80% by weight of the surface-infused gel layer after solvent loss, and alternatively in the range of from about 10% independently to about 70% by weight of the surface-infused gel layer, and another non-restrictive version in the range of from about 15% independently to about 60% by weight of the surface-infused gel layer.

In one non-limiting embodiment, the liquid gel mixture used to produce a surface-infused gel layer may contain phase change materials having particle sizes in the range of from about 0.1 independently to about 3000 microns, and alternatively in the range of from about 1 independently to about 1500 microns, and alternatively non-restrictive version in the range of from about 1 independently to about 750 microns, and another non-restrictive version in the range of from about 1 independently to about 500 microns.

The surface-infused gel layer may be soft and pliable with a modified Bloom gram hardness of less than 4000 grams with a suitable range of 20-500 grams hardness. The test procedure for the modified Bloom gram hardness is to place a 50 mm×50 mm×25 mm thick sample in a confining mold. A rod with 12.6 mm diameter and square edges compresses the sample 4 mm, and the force is measured after a 60 second relaxation time period.

One suitable, non-limiting embodiment is the use of open-celled polyurethane foam as the layering substrate. The liquid gel mixture may be used in combination with cushioning foam or bedding foam materials that are partially open-celled in nature and have very low airflows as measured per ASTM D 3574.

In one non-limiting embodiment, the low viscosity liquid gel mixture is produced with 100 parts of (SEBS) styrene-ethylene-butylene-styrene A-B-A tri-block copolymers, 1000 pph paraffinic mineral oil (parts per hundred parts of A-B-A tri-block copolymer resin), and 1000 parts of PCBTF to create a low viscosity liquid gel mixture suitable for surface infusion in a flexible cellular foam.

In one non-limiting embodiment, the highly thermally-conductive material used in the surface infusion gel liquid mixture is natural flake graphite. The thermal conductivity of natural graphite is highly anisotropic. The thermal conductivities in the direction perpendicular and parallel to the graphene layers are about 3-10 W/(m-° K) and about 140-500 W/(m-° K), respectively. The thermal conductivity of polyurethane foam is isotropic with thermal conductivities in all directions of about 0.035-0.06 W/(m-° K).

Liquid gel mixtures suitably used as a precursor for the surface-infused gel layer may be prepared by blending PCBTF, at least one flexible polymeric carrier, optional highly thermally-conductive materials, and optional performance-enhancing additives resulting in a liquid gel mixture suitable for infusion in a flexible cellular foam. Additionally, other useful property-enhancing additives may be added at any time during production of the liquid gel mixture such as, but not limited to, plasticizers, colorants, and phase change materials. The liquid gel mixture may be prepared with or without heat to produce a solution suitable for incorporation or infusion into or onto the layering substrate. Heating and mixing will increase the dissolution of the flexible polymeric carriers. Methods for preparing the liquid gel mixture include batch-wise or continuous mixing in a tank, agitated tank, mixer, rotating vessel, ribbon blender, paddle blender, plough blender, plastic screw, or any other equipment known in the skill of the art that is used for mixing liquid and solids.

In a different non-limiting embodiment, the surface-infused gel layer is produced by making a liquid gel mixture using a method employing the following steps, although not necessarily in this order: making a liquid mixture by solvating the flexible polymeric carrier in PCBTF solvent, optionally introducing a highly thermally-conductive material in the flexible polymeric carrier, optionally introducing at least one performance-enhancing additive in the flexible polymeric carrier, and infusing at least a portion of the liquid gel mixture into the layering substrate; and optionally compressing the product of layering substrate and surface-infused gel liquid mixture to produce a surface-infused gel layer on the layering substrate; and at least partially removing the PCBTF solvent.

In another non-limiting embodiment, open-celled polyurethane foam is pressed onto a relatively thin liquid layer of the liquid gel mixture so that the liquid penetrates the open cells of the flexible cellular foam. The solvent in the surface-infused gel liquid evaporates to lock the gel layer onto or within the foam surface. The foam and surface-infused gel liquid may optionally be compressed to increase the gel penetration depth in the open-celled foam.

While the most common form herein is expected to produce an external surface-infused gel layer infused on the surface of a substrate, the physical embodiment is not limited to a layer, but may have other physical configurations including, but not necessarily limited to, a core or band within a substrate, a regular or irregular pattern of regions within the substrate, and the like.

Figure 18:
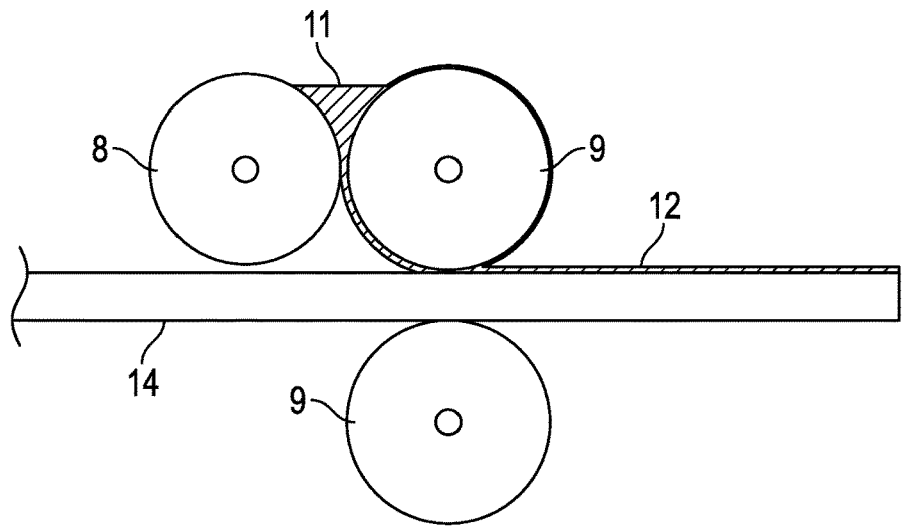
FIG. 18 depicts a lamination system.

Alternatively, FIG. 18 depicts a lamination system used to coat a layering substrate 14 with liquid gel mixture 11. A medium-sized roller 8 and a larger-sized roller 9 create a trough for the liquid gel mixture 11. This is then applied to the layering substrate 14 as a larger-sized roller 9 moves the layering substrate through the process. The product 12 is an evenly coated substrate with a surface-infused gel liquid layer.

Figure 19:
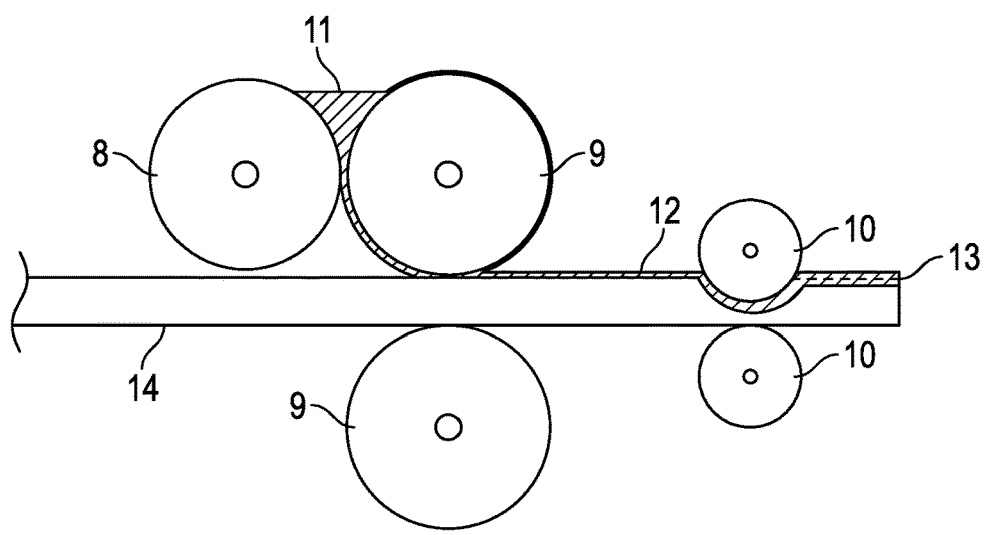
FIG. 19 depicts a lamination system with downstream compression roller.

Alternatively, FIG. 19 depicts a lamination system used to coat a layering substrate 14 with a liquid gel mixture 11. A medium-sized roller 8 and a larger-sized roller 9 create a trough for the liquid gel mixture 11. The liquid gel mixture is then applied to the layering substrate 14 as a larger-sized roller 9 moves the layering substrate through the process. The product 12 is an evenly coated substrate with a surface-infused gel liquid mixture. The gel liquid-coated substrate 12 is then compressed to a varied thickness (50% in the drawn example) between two smaller-sized rollers 10, which infuses the liquid gel mixture within the layering substrate. The product 13 is a substrate with a surface-infused gel liquid.

Figure 24:
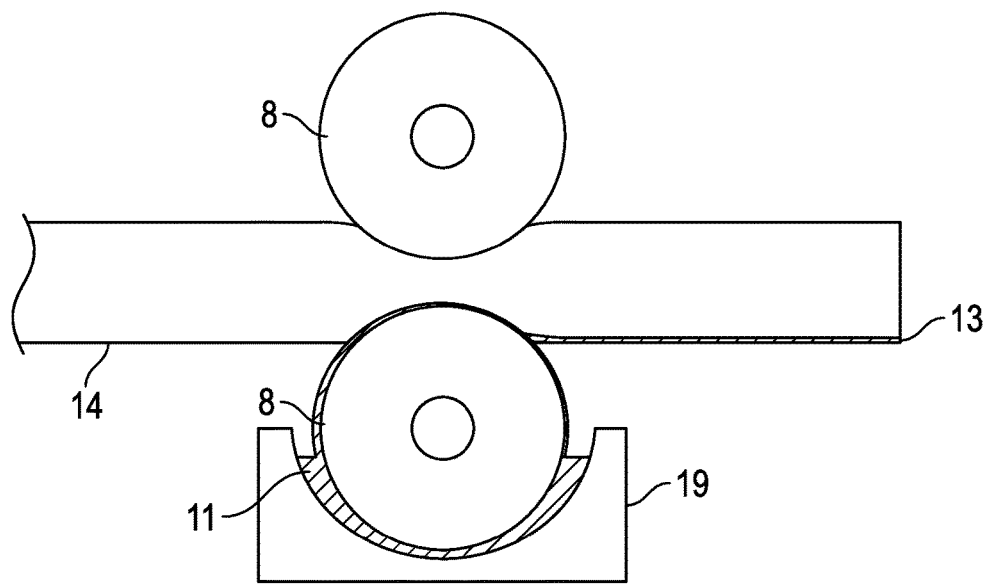
FIG. 24 depicts a lamination system with dual compression rollers and liquid trough.

Alternatively, FIG. 24 depicts a lamination system used to coat a layering substrate 14 with a liquid gel mixture 11. Two medium-sized rollers 8 are vertically aligned on their center lines with an adjustable gap between them. These rollers are driven and the layering substrate 14 is fed through the gap and compressed. Under the bottom roller is an elliptical trough 19 containing the liquid gel mixture 11. The liquid gel mixture 11 coats the bottom roller, and the liquid gel mixture coating is applied to the layering substrate 14 via the bottom roller and the result is the product 13, which is a substrate with a surface-infused gel liquid. The solvent in product 13 evaporates, locking the surface-infused gel layer onto the layering substrate 14.

Figure 25:
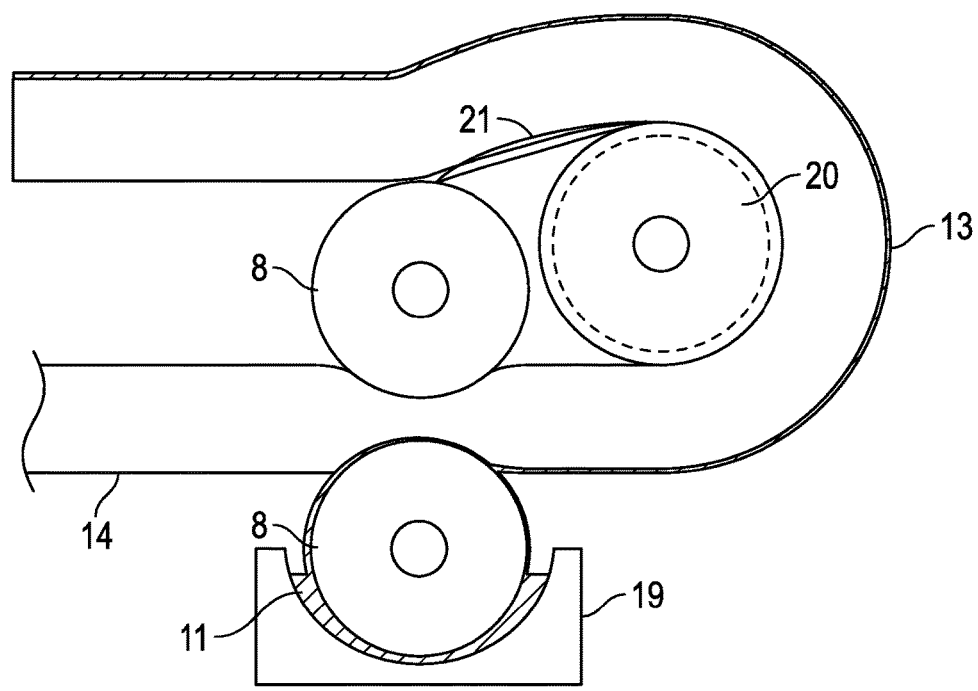
FIG. 25 depicts a lamination system with dual compression rollers, liquid trough, and vacuum drum.

Alternatively, FIG. 25 depicts a lamination system used to coat a layering substrate 14 with a liquid gel mixture 11. Two medium-sized rollers 8 are vertically aligned on their center lines with an adjustable gap between them. These rollers are driven and the layering substrate 14 is fed through the gap and compressed. Under the bottom roller is an elliptical trough 19 containing the liquid gel mixture 11. The liquid gel mixture 11 coats the bottom roller 8, and the liquid gel mixture coating is applied to layering substrate 14 via the bottom roller 8 and then inverted by a vacuum roller 20. A vacuum separation plate 21 is used to remove the product 13, which is a substrate with a surface-infused gel liquid. The solvent in product 13 evaporates, locking the surface-infused gel layer onto the layering substrate 14.

Figure 26:
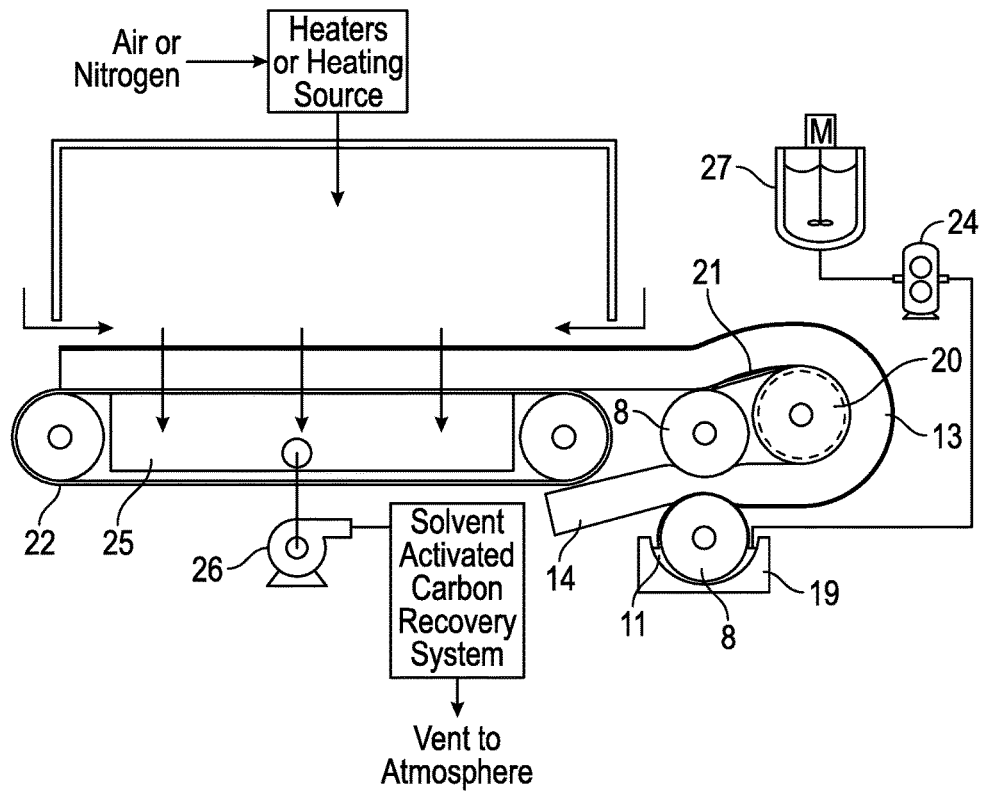
FIG. 26 depicts a lamination system with dual compression rollers, drying chamber with vacuum bed, and solvent recovery system.

Alternatively, FIG. 26 depicts a lamination and drying system used to coat a layering substrate 14 with a liquid gel mixture 11. Two medium-sized rollers 8 are vertically aligned on their center lines with an adjustable gap between them. These rollers are driven and the layering substrate 14 is fed through the gap and compressed. Under the bottom roller 8 is an elliptical trough 19 containing the liquid gel mixture 11 which is filled by a gear pump 24 connected to a liquid gel mixture agitation vessel 27. Optionally, the liquid gel mixture may be gravity feed, by pressure transfer or by other common pumping methods or means for transferring a liquid. The liquid gel mixture 11 coats the bottom roller, and the liquid gel mixture is applied to the layering substrate 14 via the bottom roller and then inverted by a vacuum roller 20. A vacuum separation plate 21 is used to remove the product 13, which is a substrate with a surface-infused gel liquid. A perforated conveyor 22 then moves the product 13 into a heated drying chamber to remove any solvents. A vacuum table 25 is used to keep the chamber under a negative pressure and collect volatilized solvent. A vacuum fan 26 moves the solvent-enriched air into an activated carbon recovery system for adsorption of the solvent onto the activated carbon. The cleaned air is vented to the atmosphere. When the activated carbon bed is saturated, the activated carbon recovery is regenerated to remove adsorbed solvent for downstream recovery.

Figure 27:
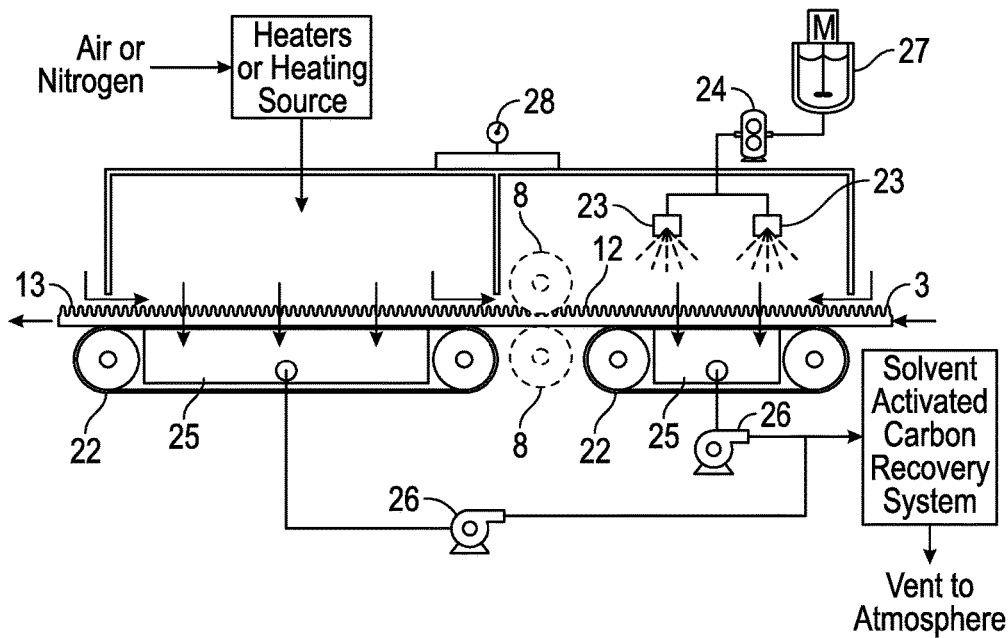
FIG. 27 depicts a spray coating system with optional downstream dual compression rollers, drying chamber with vacuum bed, and solvent recovery system.

Alternatively, FIG. 27 depicts a spraying and drying system used to coat a non-planar substrate 3 with a liquid gel mixture 11. The substrate is moved by a conveyor 22 into a spraying chamber kept under a negative pressure by a vacuum table 25. The liquid gel mixture 11, which is fed by a gear pump 24 connected to a liquid gel mixture agitation vessel 27, is sprayed through nozzles 23 onto the non-planar surface 3. The result is an evenly coated substrate with surface-infused gel liquid 12. Optionally, two medium-sized rollers 8, vertically aligned on their center lines with an adjustable gap between them, may be utilized after spray coating. These rollers are driven and the coated substrate 12 is fed through the gap and compressed. The optional result is a product 13, which is a substrate with a surface-infused gel liquid. A conveyor 22 then moves the substrate into a heated drying chamber to remove any solvents. A vacuum table 25 is used to keep the chamber under a negative pressure and collect volatilized solvent. Two fans 26 are operated to maintain the spraying chamber at a lower pressure than the drying chamber, as indicated by a pressure gauge 28. The fans 26 move the solvent-enriched air into an activated carbon recovery system for adsorption of the solvent onto the activated carbon. The cleaned air is vented to the atmosphere. When activated carbon bed is saturated, the activated carbon is regenerated to remove adsorbed solvent for downstream recovery.

In an alternative embodiment, at least one infused gel layer may be produced by applying a liquid gel mixture within or onto the surface or in any location within the interior cavity of a mold for making molded products such as, but not limiting to, pillows, beds, cushioning or padding for sports equipment, wheelchair seats, automotive seats, cushions, and other articles. Individual substrate components may be added to the mold to react, bind, or encapsulate the liquid gel mixture.

In an alternative embodiment, at least one surface-infused gel layer and combinations with layering substrates described herein may be produced under pressure or under vacuum using batch or continuous processes. Pressure may be applied by platens or conveyors which compress the foam before the foam is fully cured. Alternatively, the method may be practiced under atmospheric pressure, in the range of atmospheric pressure to greater than atmospheric pressure, or in the range of atmospheric pressure to less than atmospheric pressure.

In an alternative embodiment, the liquid gel mixture may be produced in liquid form, applied within or onto layering substrate, or post cured by solvent removal by batch or continuous process under many different temperatures and pressures. The method may be practiced under atmospheric pressure, in the range of atmospheric pressure to greater than atmospheric pressure, or in the range of atmospheric pressure to less than atmospheric pressure. Alternatively, the method may be practiced from temperatures of about −225° C. to about 250° C.

It will be appreciated that the methods described herein are not limited to these examples, since there are many possible combinations for making surface-infused gel layers by utilizing a liquid gel mixture with open-celled or partially open-celled foams that can be used in cushion foams or mattresses.

APPLICATIONS OF THE HTC LAYER AND CUSHION FOAMS

The list below shows some, but not all, of the applicable uses of at least one surface-infused gel layer and at least one layering substrate produced by the methods herein.
1. Mattresses, mattress topper pads, pillows, and bed-top products;
2. General furnishings and upholstered furniture including pet beds, cushions, armrests, seat-backs, foot-rests, decorative cushioning and functional support;
3. Use in medical applications such as wheelchair seat cushions and backs, orthopedic shoes, hospital beds, gurney pads, medical bed pads, medical supports and cushioning;
4. Use in conventional open-celled polyether polyurethane foam, partially open-celled polyether polyurethane foam, reticulated polyurethane foam, high-resiliency polyether polyurethane foam, open-celled viscoelastic polyether polyurethane foam, partially open-celled viscoelastic polyether polyurethane foam, open-celled polyester polyurethane foam, partially open-celled polyester polyurethane foam, open-celled polyester foam, partially open-celled polyester foam, latex foam, melamine foam for general cushioning, energy absorption, packaging, sealants and fillers;
5. Seat cushions, seat backs, headrests and armrests of chairs and seats for application in vehicles such as automobiles, motorcycles, bicycles, buses, aircraft, watercraft, tractors and other agricultural equipment such as combines, construction equipment and utility vehicles;
6. Cushioning for sports equipment;
7. Personal protective equipment; and
8. Toys Layering substrates in combination with at least one surface-infused gel layer, optional highly thermally-conductive materials, and optional performance-enhancing additives described herein may find utility in a very wide variety of applications. More specifically, in other non-limiting embodiments, the combination of surface-infused gel layer produced from a liquid gel mixture and layering substrate would be suitable as pillows or pillow components, including, but not necessarily limited to, pillow wraps or shells, pillow cores, pillow toppers, medical comfort pads, medical mattresses and similar comfort and support products, and residential/consumer mattresses, mattress topper pads, and similar comfort and support products typically produced with conventional flexible polyurethane foam or fiber. All of these uses and applications are defined herein as "bedding products". Alternatively, the combination of layering substrate and at least one surface-infused gel layer produced from a liquid gel mixture as described herein are expected to be useful for the production of upholstered furniture to replace conventional foam, polyester fiber or other support materials. Examples of these applications include, but are not limited to, upholstered chair backs, head-rests, foot-rests, arm-rests, neck supports, quilting support and cushioning and the like, and combinations thereof. All of these latter uses and applications are defined herein as "furniture upholstery". Alternatively, the combination of surface-infused gel layer produced from liquid gel mixture and layering substrate may be used in personal protective equipment and toys.

FIG. 1 schematically depicts a heat source, for instance a body mass, which is introducing thermal energy into the standard, open-celled viscoelastic foam layer 2 through conduction. This Figure depicts a body lying on a mattress. The surfaced-infused gel layer 5 absorbs heat and uses enhanced thermal conductivity properties to move the heat laterally through the mattress. In turn, the heat is conducted and convected through open air cells up through layer 2 to the top of the mattress. At this point, natural convection works to remove heat from the system. In this example, the viscoelastic layer 2 and surface-infused gel layer 5 are constructed upon another viscoelastic layer 2 and a foundation of base prime foam 1. As used herein, "prime foam" is defined as a polyether polyurethane commodity flexible foam commonly used in furniture and bedding applications.

Figure 2:
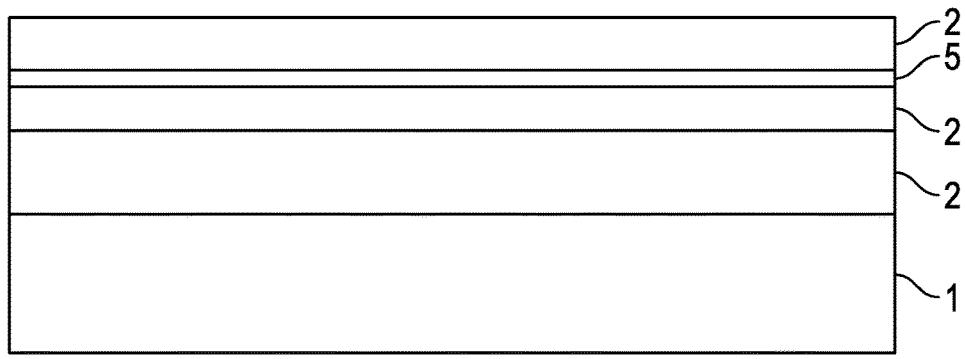
FIG. 2 is an example construction using a cushion and/or mattress application.

FIG. 2 is a first non-limiting example of construction using a cushion and/or mattress application. The base of the section is a prime foam layer 1. On top of this is a 2 inch (5 cm) standard, open-celled viscoelastic (visco) layer 2. The upper layers consist of a 1 inch (2.5 cm) layer 2 of standard visco foam, followed by layer 5, which is a surface-infused gel layer. The top layer 2 is another 1 inch (2.5 cm) layer of standard visco foam. It will be appreciated that the dimensions given in the examples and descriptions of the various Figures are merely illustrative and are not intended to be limiting.

Figure 3:
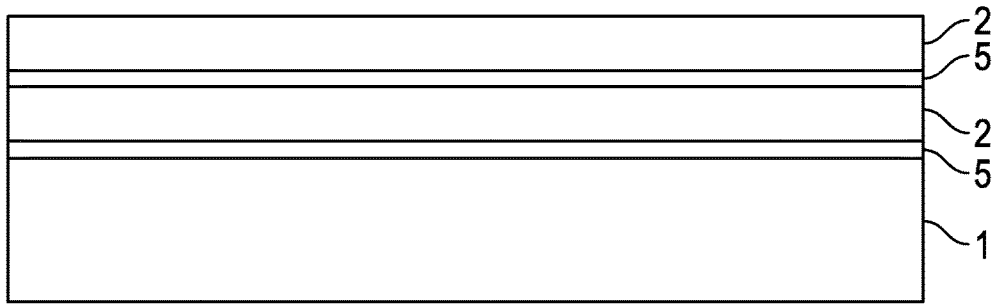
FIG. 3 is an example construction using a cushion and/or mattress application.

FIG. 3 is a second non-restrictive example construction using a cushion and/or mattress application. The base of the section is a prime foam layer 1. On top of this is a surface-infused gel layer 5 followed by a 2 inch (5 cm) layer 2 of standard, open-celled viscoelastic foam. This pattern is repeated, as there is another Surface-infused gel layer 5 and another 2 inch (5 cm) visco layer 2.

Figure 4:
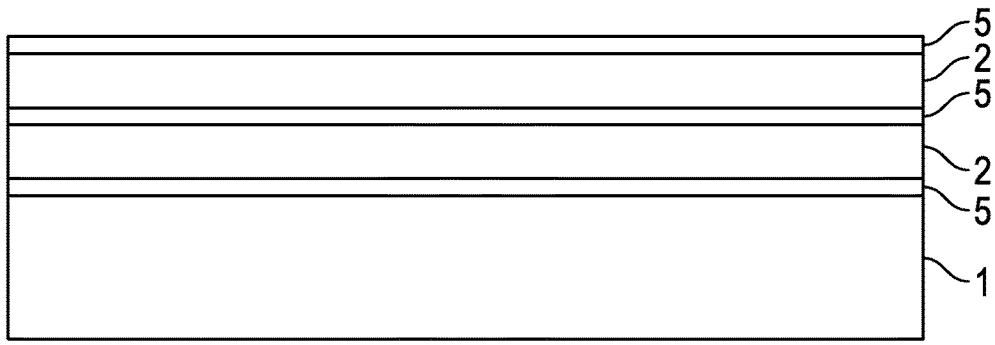
FIG. 4 is an example construction using a cushion and/or mattress application.

FIG. 4 is a third example construction using a cushion and/or mattress application. The base of the section is a prime foam layer 1. On top of this is a surface-infused gel layer 5 followed by a 2 inch (5 cm) layer 2 of standard, open-celled viscoelastic foam. This pattern is repeated, as there is another surface-infused gel layer 5 and another 2 inch (5 cm) visco layer 2. The top of the entire construction is a surface-infused gel layer 5.

Figure 5:
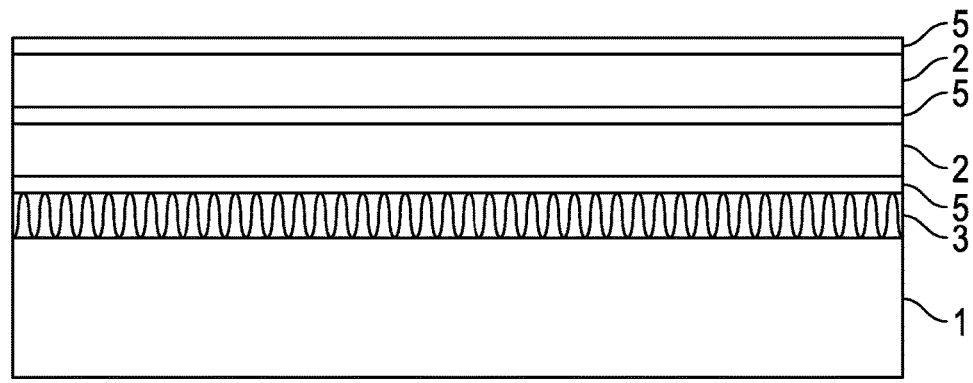
FIG. 5 is an example construction using a cushion and/or mattress application.

FIG. 5 is a fourth example construction using a cushion and/or mattress application. The base of the section is a prime foam layer 1 having a non-planar surface 3. On top of this is a surface-infused gel layer 5 followed by a 2 inch (5 cm) layer 2 of standard, open-celled viscoelastic foam. This pattern is repeated, as there is another surface-infused gel layer 5 and another 2 inch (5 cm) visco layer 2. The top of the entire construction is a surface-infused gel layer 5.

Figure 6:
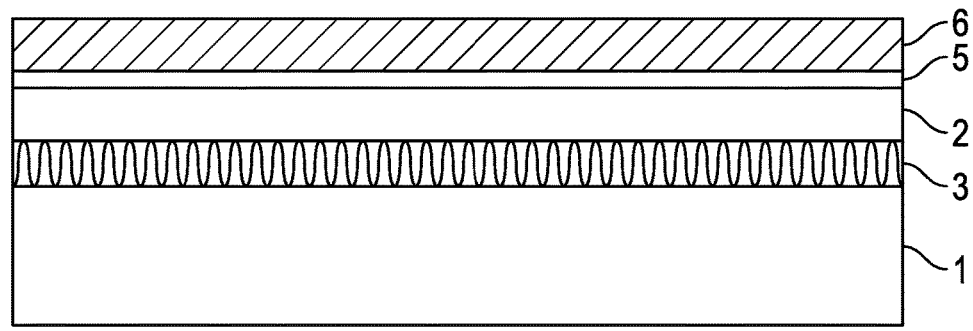
FIG. 6 is an example construction using a cushion and/or mattress application.

FIG. 6 is a fifth example construction using a cushion and/or mattress application. The base of the section is a prime foam layer 1 having a non-planar surface 3. On top of this is a 2 inch (5 cm) standard, open-celled viscoelastic layer 2.

The next section is the surface-infused gel layer 5. The top of this example is a 2 inch (5 cm) layer 6 of partially open-celled viscoelastic foam.

Figure 7:
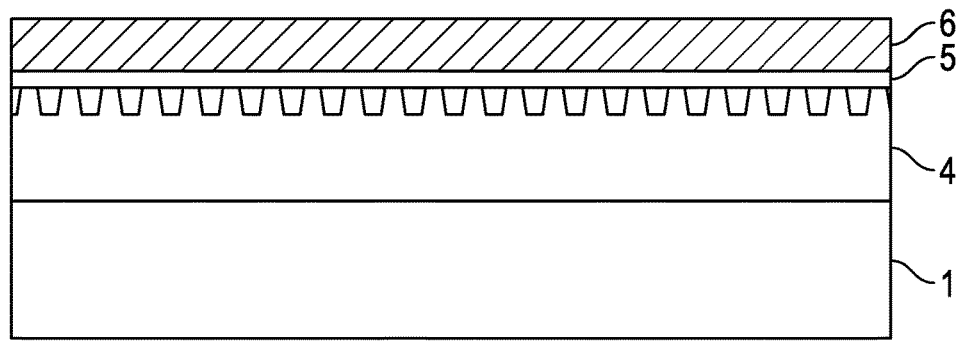
FIG. 7 is an example construction using a cushion and/or mattress application.

FIG. 7 is a sixth example construction using a cushion and/or mattress application. The base of the section is a prime foam layer 1. The second layer 4 is also prime foam, but utilizing a ridged pattern. This pattern may be oriented longitudinally or latitudinal, but is not limited to these examples. On top of this is a surface-infused gel layer 5. The top layer 6 is a 2 inch (5 cm) layer of partially open-celled viscoelastic foam.

Figure 8:
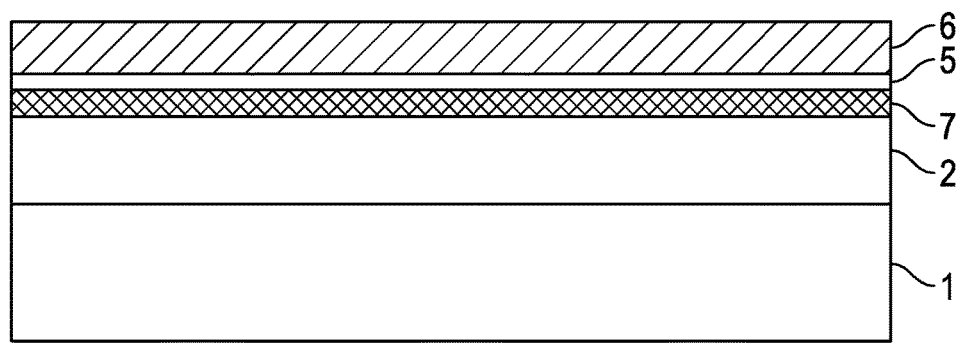
FIG. 8 is an example construction using a cushion and/or mattress application.

FIG. 8 is a seventh example construction using a cushion and/or mattress application. The base of the section is a prime foam layer 1. On top of this is a 2 inch (5 cm) standard, open-celled viscoelastic layer 2. Next is a non-woven mat layer 7 that is air permeable and promotes greatly increased air flow, as well as heat dissipation. This is then covered with a surface-infused gel layer 5. The top layer of this example construction is a 2 inch (5 cm) partially open-celled viscoelastic foam layer 6.

Figure 9:
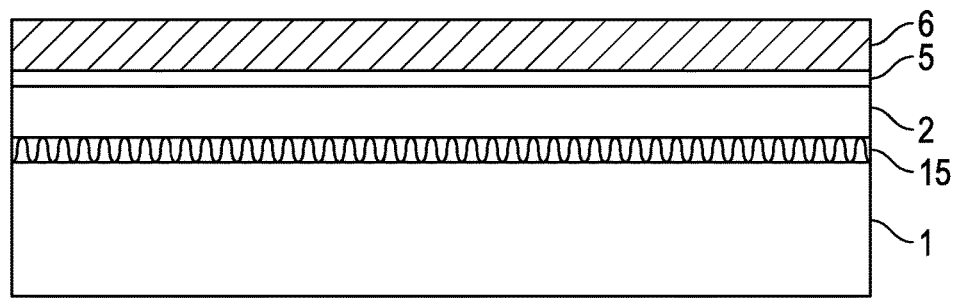
FIG. 9 is an example construction using a cushion and/or mattress application.

FIG. 9 is an eighth example construction using a cushion and/or mattress application. The base of the section is a prime foam layer 1 having a non-planar surface with surface-infused gel coating 15. On top of this is a 2 inch (5 cm) standard, open-celled viscoelastic layer 2. The next section is the surface-infused gel layer 5. The top of this example is a 2 inch (5 cm) layer 6 of partially open-celled viscoelastic foam.

Figure 10:
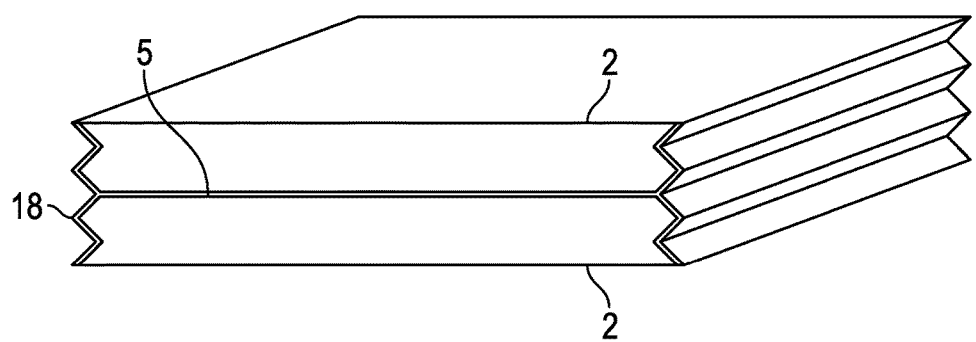
FIG. 10 is an example construction using a cushion and/or mattress application.

FIG. 10 is another non-limiting example construction using a cushion and/or mattress application. The construct has a surface-infused gel layer 5 between two standard, open-celled viscoelastic foam layers 2. The exterior ends of this example section are ridged and then coated with a surface-infused gel layer, creating a 3D surface-infused gel layer 18. The surface-infused gel layers 5 and 18 are connected to create a thermal pathway for heat to travel and acting as "radiator fins."

Figure 11:
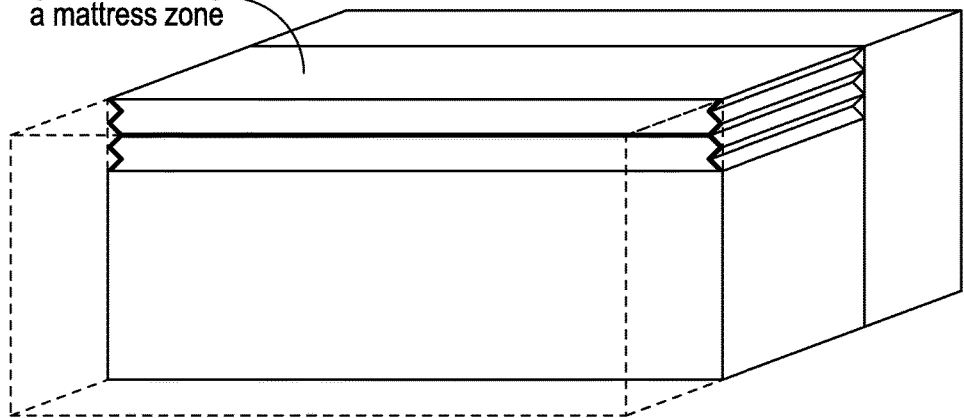
FIG. 11 is an example construction being used in a mattress zone or section.

FIG. 11 is the depiction of the FIG. 10 structure being utilized in a mattress zone, or section. The example construct from FIG. 10 is performing as an enhanced thermal-conductive layer, while only being used in the middle region of the example mattress. The "radiator fins" are removing more heat from the mattress by utilizing increased thermal conductivity and surface area.

Figure 12:
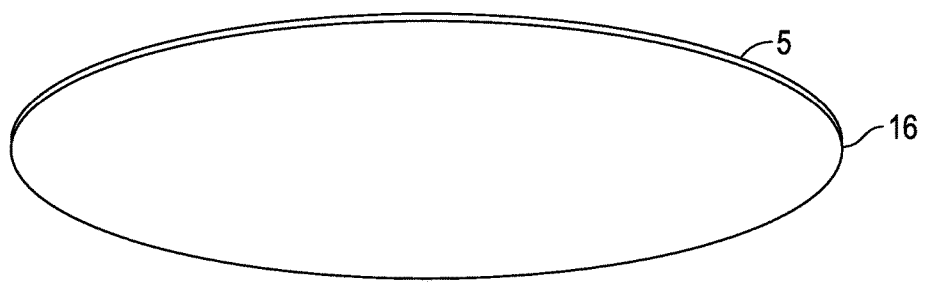
FIG. 12 is a molded pillow example.

FIG. 12 is a molded pillow example. The molded foam pillow 16 is coated and/or infused with a surface-infused gel layer 5 on the surface. This may be done regionally or over the entirety of the pillow.

Figure 13:
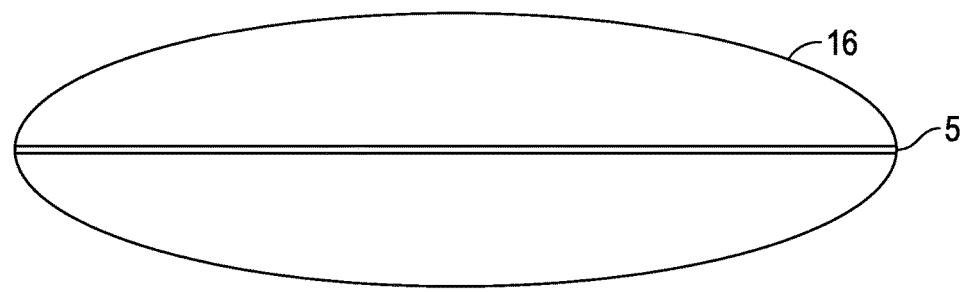
FIG. 13 is a molded pillow example.

FIG. 13 is a second molded pillow example. The molded foam pillow 16 has an internal surface-infused gel layer 5. The number of layers, as well as the layer thickness, may vary and should not be considered limiting.

Figure 14:
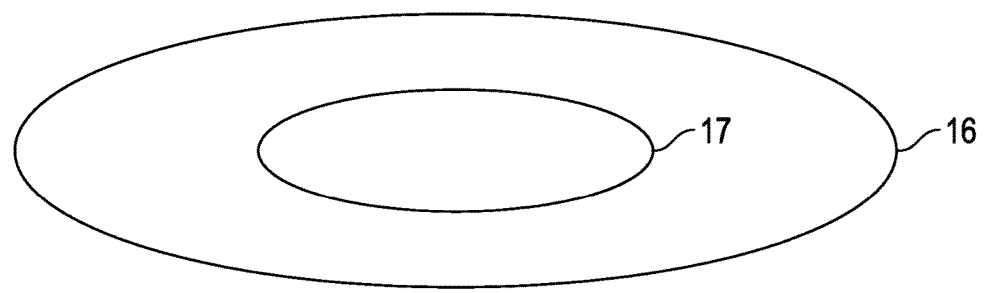
FIG. 14 is a molded pillow example.

FIG. 14 is the third molded pillow example. The molded foam pillow 16 has a gel layer core 17. The core may vary in several ways that may include, but are not limited to, size, shape, and location within the pillow. The core may also be exposed to the surface of the pillow to help channel heat to the environment surrounding the pillow.

Figure 15:
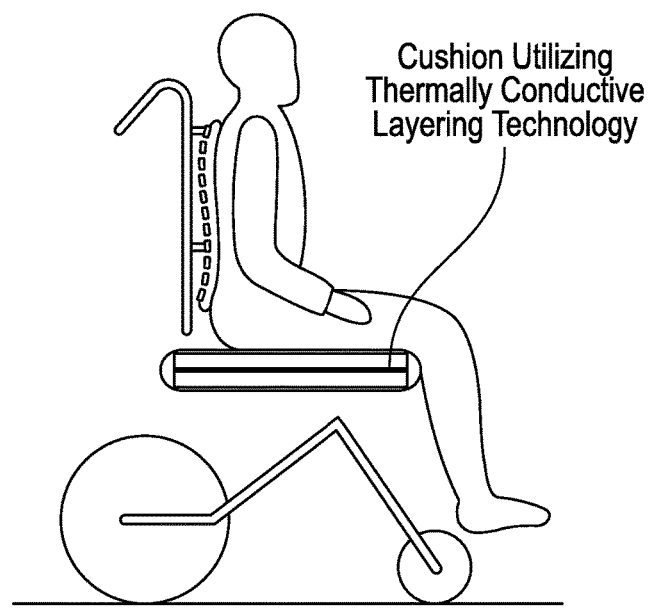
FIG. 15 is an example construction using a cushion with surface-infused gel layer in a wheelchair cushion.

FIG. 15 is an example application using a cushion application. In this Figure, any of the example constructions, or other variations, may be used in the cushion of a wheelchair.

Figure 16:
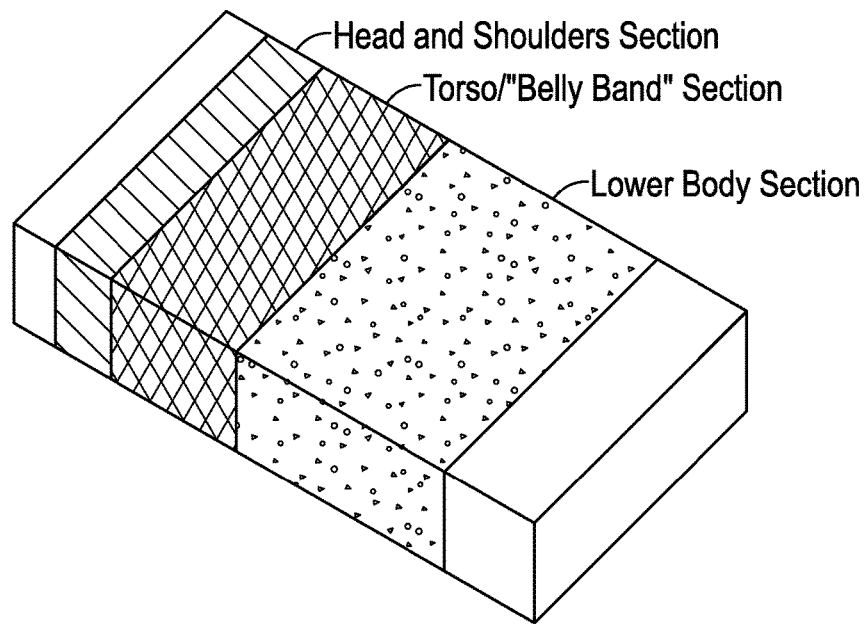
FIG. 16 is example breakdown of lateral mattress zones in a cushion and/or mattress application.

FIG. 16 is an example breakdown of lateral mattress zones. These zones include: lower body, torso/"belly band", and head and shoulders. These zones may or may not include surface-infused gel layers, example constructions, other mattress layer constructions, or any variation thereof. Furthermore, the zones shown are not limiting, but used as an example to show the possibility of utilizing enhanced thermally dissipating layers in specific areas of cushions and/or a mattress.

Figure 17:
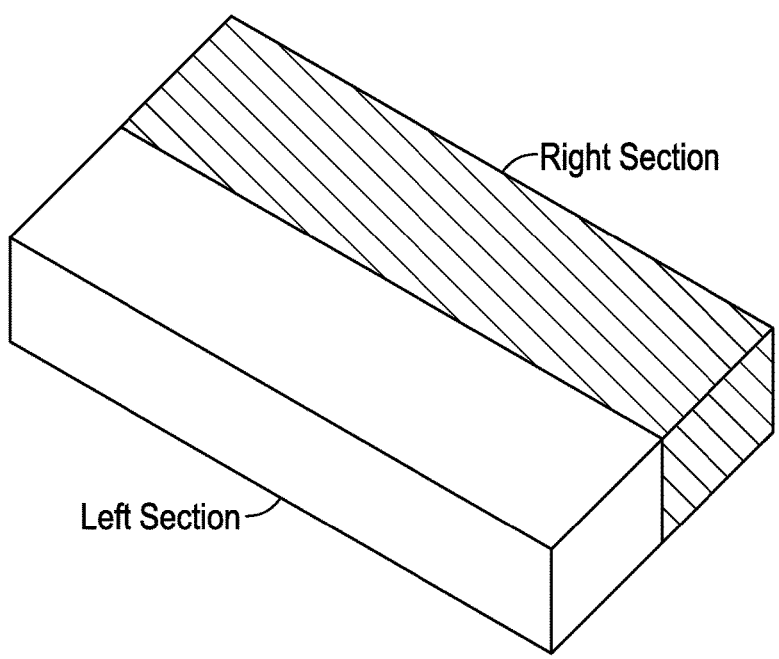
FIG. 17 is example breakdown of longitudinal mattress zones in a cushion and/or mattress application.

FIG. 17 is an example breakdown of longitudinal mattress zones. These zones include left or right sections. These zones may or may not include surface-infused gel layers, example constructions, other mattress layer constructions, or any variation thereof. Furthermore, the zones shown are not limiting, but used as an example to show the possibility of utilizing enhanced thermally dissipating layers in specific areas of cushions and/or a mattress.

FIGS. 16 and 17 are meant to illustrate the usage of surface-infused gel layers in different regions of the mattress to enhance thermal conductivity in specific regions; they are not to be interpreted as limiting design figures. The exact configuration of these zoned surface-infused gel layers would be dependent on the purpose of the mattress construction.

The invention will now be described more specifically with respect to particular formulations, methods and compositions herein to further illustrate the invention, but which examples are not intended to limit the methods and compositions herein in any way.

EXAMPLE I

The liquid gel mixture was prepared by blending 0.9 parts of KRATON G1651H, 9.1 parts of paraffinic oil, and 20 parts of parachlorobenzotrifluoride (PCBTF) in a quart cup. The solution was mixed at 620 rpm until all of the solids were fully dissolved. 10 parts of natural graphite flake was incorporated. This solution was then mixed at high shear for 60 seconds at approximately 1760 rpm. The liquid gel mixture was heated in an oven to a temperature at approximately 70° C. 167 grams of the liquid gel mixture was evenly poured into a 10 inch×10 inch (25 cm×25 cm) mold. Next, a 10 inch×10 inch×0.75 inch (25 cm×25 cm×1.9 cm) block of foam was placed onto the liquid gel mixture. Slight, even pressure was applied to ensure contact with the liquid gel mixture. After waiting 5 seconds, the foam was inverted and compressed with a 4 inch (10 cm) roller to 50% of the original foam thickness (0.375 inch (0.95 cm) in this example). The substrate product with surface-infused liquid gel mixture was placed in an oven to volatilize PCBTF. Once the PCBTF was fully evaporated, the surface-infused gel layer was cured and used for steady-state heat transfer testing.

EXAMPLE II

The liquid gel mixture was prepared by blending 0.9 parts of KRATON G1651H, 9.1 parts of paraffinic oil, and 20 parts of parachlorobenzotrifluoride (PCBTF) in a quart cup. The solution was mixed at 620 rpm until all of the solids were fully dissolved. 15 parts of natural graphite flake was incorporated into the solution. This solution was then high shear mixed for 60 seconds at approximately 1760 rpm. The liquid gel mixture was heated in an oven to a temperature of approximately 70° C. 167 grams of the liquid gel mixture was evenly poured into a 10 inch×10 inch (25 cm×25 cm) mold. Next, a 10 inch×10 inch×0.75 inch (25 cm×25 cm×1.9 cm) block of viscoelastic foam was placed onto the liquid gel mixture. Slight, even pressure was applied to ensure contact with the mixture. After waiting 5 seconds, the foam was inverted. The foam was not compressed. The substrate product with surface-infused gel liquid was placed in an oven to volatilize PCBTF. Once the PCBTF was fully evaporated, the uncompressed surface-infused gel layer was cured and used for steady-state heat transfer testing.

EXAMPLE III

The gel liquid mixture was prepared by blending 1 parts of KRATON G1651H, 10 parts of paraffinic oil, 19.8 parts of PCBTF and 0.1 parts of natural graphite flake. The solution was mixed at 620 rpm until all of the solids were fully dissolved. 11 parts of a microencapsulated phase change material (MPCM) having solid/liquid phase transition temperature of 28° C. was then added slowly to ensure a fine distribution and minimize agglomeration. Addition of MPCM significantly increased the viscosity of the liquid gel mixture. This solution was then mixed at high shear for 60 seconds at approximately 1760 rpm. The result is a smooth liquid with a viscosity near 1000 centipoise. Open-celled viscoelastic foam samples with dimensions of 15 inch long×9 inch wide×2 inch (38 cm×23 cm×5 cm) thick, a density of 4 lb/ft$^3$ (64 kg/m$^3$), an airflow of 6 scfm, and an 25% indentation force deflection (25% IFD) of 9.0 lbf/50 in$^2$ (39.6N/323 cm$^2$) were used as a substrate for the application of liquid gel mixture. The uncoated foam samples were fed through chain driven rollers that were vertically aligned on their center lines. The rollers were four inches in diameter and were spaced with a 0.8 inch gap between them, which compressed the 2 inch (5 cm) thick foam by 60%. The rollers are turned with a linear velocity or circumferential velocity equal to 0.54 in/s, or 2.18 ft/min (0.66 m/min). Located under the bottom roller was an elliptical trough, which contained the liquid gel mixture. The bottom roller was position for 1.5 inch (3.8 cm) depth in the liquid gel mixture. The liquid gel mixture evenly coated the roller prior to pulling the foam sample through. The foam with surface-infused liquid gel mixture was allowed to "air dry" in a well-ventilated location. The result was an open and breathable surface-infused gel layer. The original foam sample had an airflow of 6.0 scfm, and the coated foam had an airflow of 4.8 scfm. The surface-infused gel layer after solvent loss accounted for 16.6% by weight of the open-celled foam/surface-infused gel layer product, also referred to as the "loading." The foam was noticeably cooler on the surface-infused gel layer surface than the untreated foam surface. The surface-infused gel layer surface had very low tack, or "sticky" properties.

Steady-state heat transfer tests were performed by placing 5 layers of 10 inch×10 inch×0.75 inch (25 cm×25 cm×1.9 cm) viscoelastic foam used in examples 1-2 on two ¼ inch (0.64 cm) hardboards, and placing a foam containing the surface-infused gel layer produced from Example 1 or Example 2 with the surface-infused gel layer side facing down or 0.75 inch (1.9 cm) from the surface. A temperature-controlled 3 inch (7.6 cm) diameter×¾ inch (1.9 cm) thick steel disk was placed on top of the foam surface in the middle of the 10 inch×10 inch (25 cm×25 cm) area. The steel disk had a silicone heater attached to the top surface and a temperature probe connected to a temperature controller. The heater set-point was 98° F. (37° C.). After heating to steady-state for at least 12 hours, the heater was taken off the top surface, and a FLUKE IR camera (Model TiR32) was used to record a thermal image of each layer. After the first layer image was recorded, the first layer was removed and the image of the second layer was recorded. The process repeated until the surface of the hardboard was recorded. Temperature profiles were extracted from the Fluke imaging software and plotted for the different levels of the foam composite containing a surface-infused gel layer.

DISCUSSION OF RESULTS

Figure 20:
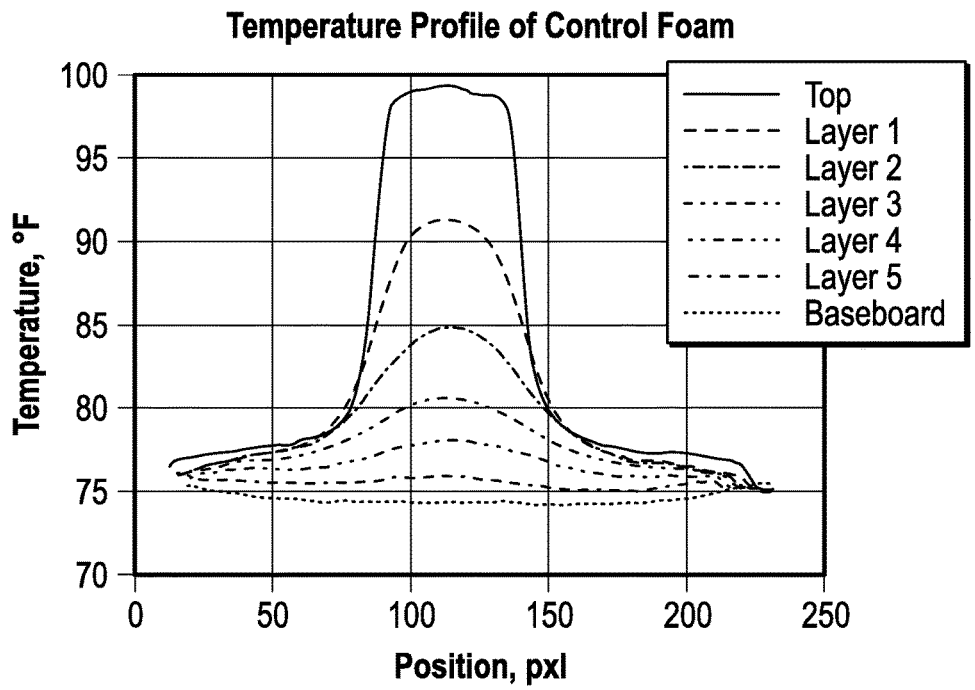
FIG. 20 is a graph of the temperature profile of control foam.
Figure 21:
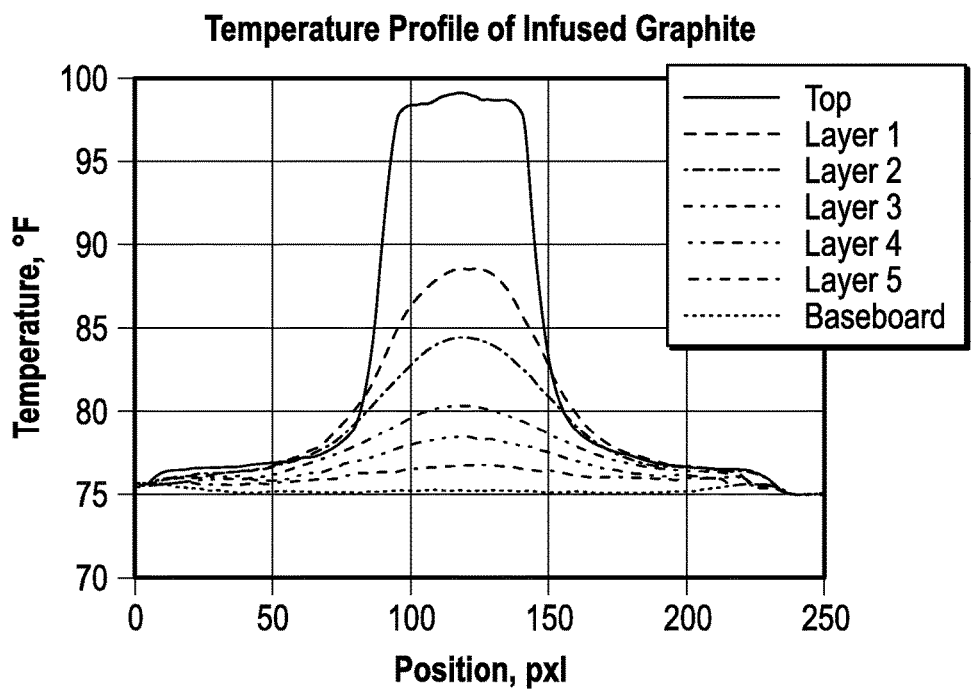
FIG. 21 is a graph of the temperature profile of foam having an compressed surface-infused gel layer with graphite.
Figure 22:
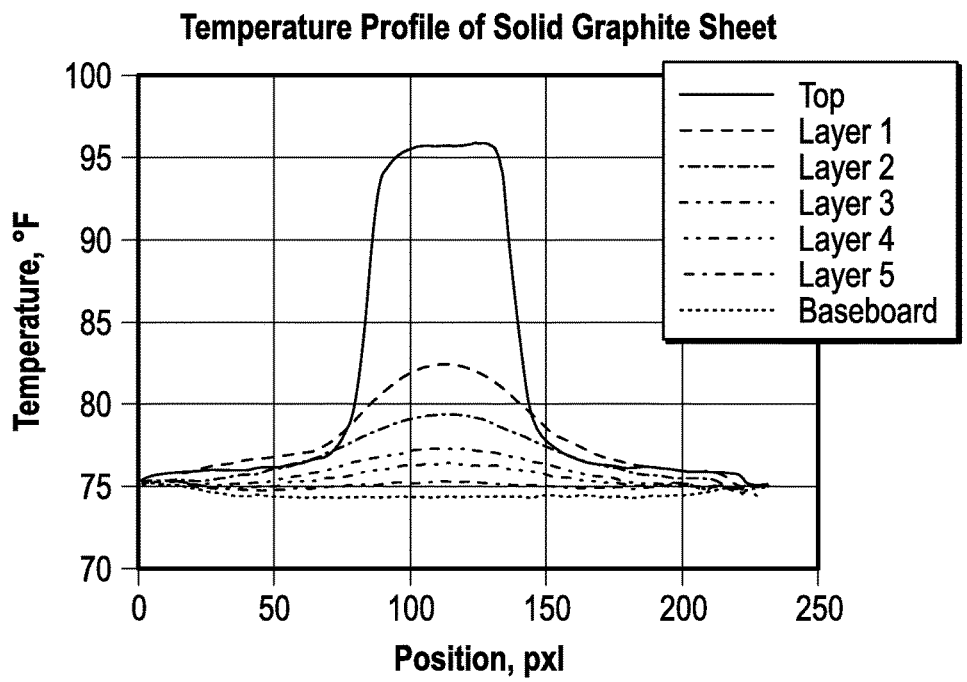
FIG. 22 is a graph of the temperature profile of foam having an uncompressed surface-infused gel layer with graphite.
Figure 23:
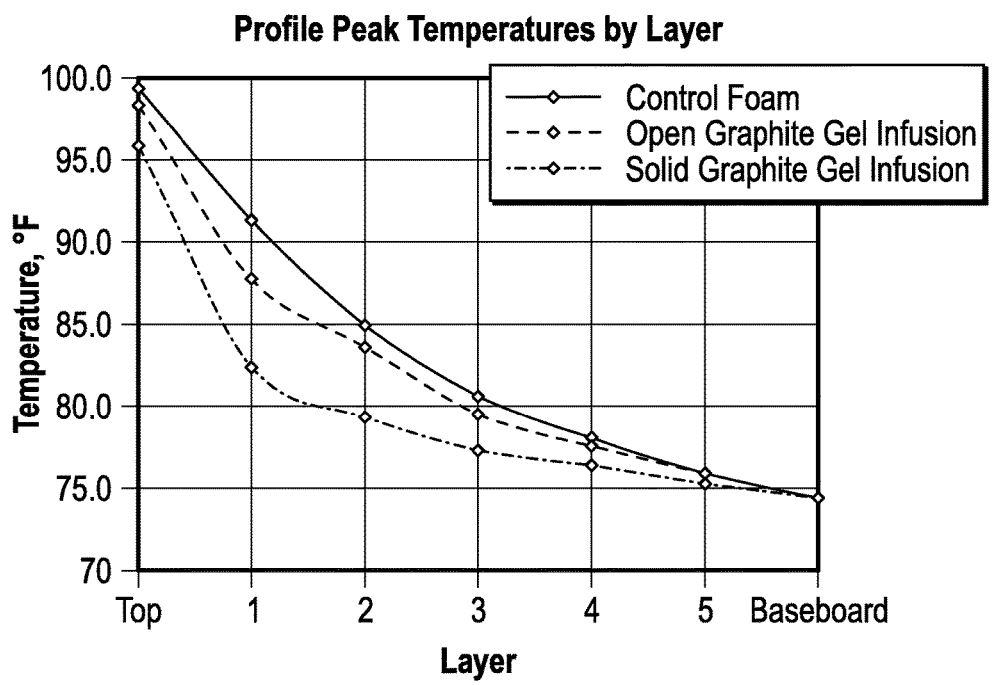
FIG. 23 is a graph of the profile peak temperatures by layer in the test composite.

FIGS. 20, 21, and 22 show the foam temperature along a diagonal line from one corner of the foam to the other opposite diagonal corner of the foam, for Tests 1, 2 and 3, respectively, as will be discussed. The line passed through the centerline of the heater. Table 1 and FIG. 23 show the peak temperatures measured on the horizontal plane of each foam element located within the cylindrical vertical boundary of the heating element. Test number 1, which had 6 layers of viscoelastic foam, showed an 8° F. (5° C.) temperature differential from the top surface of the composite to the top of the first layer. Test number 2 had 5 layers of the same viscoelastic foam used in Test 1 and the surface-infused gel layer/foam sample produced in Example I. Test 2 showed a temperature differential of 10.6° F. (6.6° C.) from the top surface of the composite to the top of the first layer, resulting in 33% greater temperature differential compared to Test 1. Test number 3 had 5 layers of the same viscoelastic foam used in Test 1 and the surface-infused gel layer/foam sample produced in Example II. Test 3 showed a temperature differential of 13.5° F. (9.4° C.) from the top surface of the composite to the top of the first layer, resulting in 69% greater temperature differential compared to Test 1. Heat fluxes were not determined, but the heat flow will be approximately proportional to the temperature differential.

TABLE 1

Centerline Temperature Profile

| Description | Units | Test Number | | |
|---|---|---|---|---|
| | | 1 Control Foam 5 Foam Layers | 2 Example I Foam on top layer with surface-infused gel layer down and 4 layers of control foam | 3 Example II Foam on top layer with surface-infused gel layer down and 4 layers of control foam |
| PEAK TEMPERATURE PROFILE WITHIN HEATER VERTICAL BOUNDARY | | | | |
| Top Layer | ° F. | 99.3 | 98.3 | 95.8 |
| Top of Layer 1 | ° F. | 91.3 | 87.7 | 82.3 |
| Top of Layer 2 | ° F. | 84.9 | 83.6 | 79.3 |
| Top of Layer 3 | ° F. | 80.6 | 79.5 | 77.3 |
| Top of Layer 4 | ° F. | 78.0 | 77.6 | 76.4 |
| Top of Layer 5 | ° F. | 75.9 | 75.9 | 75.3 |
| Top of Baseboard | ° F. | 74.4 | 74.4 | 74.4 |
| Temperature Differential between Top Layer and Bottom Layer | ° F. | 8.0 | 10.6 | 13.5 |
| % Increase in Heat Flow | | Base | 33% | 69% |

The temperature profiles of Tests 2 and 3 show improvement in heat transfer relative to those of Test 1. Therefore, incorporation of at least one surface-infused gel layer made with a liquid gel mixture and located on, under, or in a cushion foam or mattress will improve heat transfer and provide a cooler and more comfortable sleep.

Many modifications may be made in the methods of and implementation of this invention without departing from the spirit and scope thereof that are defined only in the appended claims. For example, the exact phase change materials or phase change additives, thermally-conductive material, flexible polymeric carriers, and useful performance-enhancing additives used may be different from those used explicitly mentioned or suggested here. Additionally, techniques and methods for improving the properties and/or processing characteristics of combinations of flexible polymeric carriers, thermally-conductive materials, and layering substrates or foams other than those specifically mentioned may find utility in the methods herein. Various combinations of phase change materials or phase change additives, thermally-conductive material, flexible polymer carriers, polyols, isocyanates, catalysts and additives, and processing pressures besides those explicitly mentioned herein are expected to be useful.

The words "comprising" and "comprises" as used throughout the claims is interpreted "including but not limited to". The present invention may suitably comprise, consist or consist essentially of the elements disclosed and may be practiced in the absence of an element not disclosed.

For instance, in one non-limiting embodiment, there is provided a liquid gel mixture consisting essentially of or consisting of at least one flexible polymeric carrier solvated in parachlorobenzotrifluoride (PCBTF).

Alternatively there may be provided a liquid gel mixture consisting essentially of or consisting of at least one gelatinous A-B-A tri-block copolymer resin selected from the group consisting of styrene-ethylene-butylene-styrene (SEBS), styrene-ethylene-propylene-styrene (SEPS), styrene-ethylene-ethylene-propylene-styrene (SEEPS), styrene-butadiene-styrene (SBS), styrene-isoprene-styrene (SIS) and combinations thereof and parachlorobenzotrifluoride (PCBTF) in the range of about 0.1% to about 99% by weight of the liquid gel mixture.

Also there may be provided a liquid gel mixture consisting essentially of or consisting of styrene-ethylene-butylene-styrene (SEBS) and parachlorobenzotrifluoride (PCBTF) in the range of about 0.1% to about 99% by weight of the liquid gel mixture.

There may be further provided a liquid gel mixture consisting essentially of or consisting of styrene-ethylene-propylene-styrene (SEPS) and parachlorobenzotrifluoride (PCBTF) in the range of about 0.1% to about 99% by weight of the liquid gel mixture.

Additionally there may be provided a liquid gel mixture consisting essentially of or consisting of styrene-ethylene-ethylene-propylene-styrene (SEEPS) and parachlorobenzotrifluoride (PCBTF) in the range of about 0.1% to about 99% by weight of the liquid gel mixture.

Also there may be provided a surface-infused layering substrate consisting essentially of or consisting of at least one layering substrate having a surface, where the surface is at least partially infused with at least one cured flexible gel polymeric carrier layer, where the at least one cured flexible polymeric carrier comprises at least one highly thermally-conductive material.

Further there may be provided a method of forming a surface-infused gel layer consisting essentially of or consisting of the following steps, not necessarily in this order: making a liquid mixture by solvating at least one flexible polymeric carrier in parachlorobenzotrifluoride (PCBTF) solvent, introducing at least one highly thermally-conductive material in the flexible polymeric carrier, infusing at least a portion of the liquid gel mixture into at least one layering substrate to give a product having a surface-infused gel layer on the layering substrate, and at least partially removing the PCBTF solvent.

What is claimed is:

1. A method of forming a surface-infused gel layer comprising the following steps, not necessarily in this order:
   making a liquid gel mixture by solvating at least one flexible polymeric carrier in parachlorobenzotrifluoride (PCBTF) solvent;
   introducing at least one microencapsulated phase change material (MPCM) in the flexible polymeric carrier;
   infusing at least a portion of the liquid gel mixture into at least one layering substrate to give a product having a surface-infused gel layer on the layering substrate; and at least partially removing the PCBTF solvent from the product.

2. The method of claim 1 further comprising compressing the product of at least one layering substrate and liquid gel mixture to produce the at least one cured flexible gel polymeric carrier layer on the layering substrate.

3. The method of claim 1 where the liquid gel mixture of claim 1 has an absence of toluene.

4. The method of claim 1 where the PCBTF is present in the range of about 0.1% to about 99% by weight of the liquid gel mixture.

5. The method of claim 1 where the at least one flexible polymeric carrier is selected from a group consisting of gelatinous A-B-A tri-block copolymer elastomers, thermoplastic polyurethane elastomers, thermoplastic polyester elastomers, latex elastomers, neoprene elastomers, and combinations thereof.

6. The method of claim 5 further comprising wherein at least one flexible polymeric carrier is a gelatinous A-B-A tri-block copolymer elastomer that comprises an A-B-A tri-block copolymer resin selected from the group consisting of styrene-ethylene-butylene-styrene (SEBS), styrene-ethylene-propylene-styrene (SEPS), styrene-ethylene-ethylene-propylene-styrene (SEEPS), styrene-butadiene-styrene (SBS), styrene-isoprene-styrene (SIS) and combinations thereof.

7. The method of claim 1 where the liquid gel mixture further comprises:
a highly thermally-conductive material in the range of about 0.1% to about 95% by weight of the at least one cured flexible gel polymeric carrier layer after solvent loss; and
the highly thermally-conductive material is in solid form and has a thermal conductivity from about 100 W/(m-° K) to about 3500 W/(m-° K).

8. The method of claim 1 where the MPCM has a solid/liquid phase transition temperature from about 20° C. to about 35° C. and where the MPCM is present in the liquid gel mixture in the range of about 5% to about 80% by weight of the liquid gel mixture after solvent loss.

9. The method of claim 1 where the layering substrate is selected from the group consisting of open-celled polyether polyurethane foam, partially open-celled polyether polyurethane foam, reticulated polyurethane foam, high-resiliency polyether polyurethane foam, open-celled viscoelastic polyether polyurethane foam, partially open-celled viscoelastic polyether polyurethane foam, open-celled polyester polyurethane foam, partially open-celled polyester polyurethane foam, open-celled polyester foam, partially open-celled polyester foam, latex foam, melamine foam, and combinations thereof.

10. A method of forming a surface-infused gel layer with a lamination system where the method comprises:
forming a liquid gel mixture comprising at least one flexible polymeric carrier in parachlorobenzotrifluoride (PCBTF) and at least one microencapsulated phase change material (MPCM);
driving a top roller and a bottom roller with an adjustable gap between them;
coating the bottom roller with the liquid gel mixture;
coating a layering substrate with the liquid gel material to give a surface-infused gel layer on the layering substrate;
compressing the layering substrate an amount in the range of from about 0.1% to about 90%;
removing the layering substrate from the bottom roller coated with the liquid gel mixture; and
evaporating the PCBTF from the surface-infused gel layer to cure flexible polymeric carrier.

11. The method of claim 10 where the at least one flexible polymeric carrier is a gelatinous A-B-A tri-block copolymer elastomer that comprises an A-B-A tri-block copolymer resin selected from the group consisting of styrene-ethylene-butylene-styrene (SEBS), styrene-ethylene-propylene-styrene (SEPS), styrene-ethylene-ethylene-propylene-styrene (SEEPS), styrene-butadiene-styrene (SBS), styrene-isoprene-styrene (SIS) and combinations thereof.

12. The method of claim 10 where the liquid gel mixture further comprises:
a highly thermally-conductive material in the range of about 0.1% to about 95% by weight of the at least one cured flexible gel polymeric carrier layer after solvent loss; and
the highly thermally-conductive material is in solid form and has a thermal conductivity from about 100 W/(m-° K) to about 3500 W/(m-° K).

13. The method of claim 10 where the MPCM has a solid/liquid phase transition temperature from about 20° C. to about 35° C. and where the MPCM is present in the liquid gel mixture in the range of about 5% to about 80% by weight of the liquid gel mixture after solvent loss.

14. The method of claim 10 where the layering substrate is selected from the group consisting of open-celled polyether polyurethane foam, partially open-celled polyether polyurethane foam, reticulated polyurethane foam, high-resiliency polyether polyurethane foam, open-celled viscoelastic polyether polyurethane foam, partially open-celled viscoelastic polyether polyurethane foam, open-celled polyester polyurethane foam, partially open-celled polyester polyurethane foam, open-celled polyester foam, partially open-celled polyester foam, latex foam, melamine foam, and combinations thereof.

15. A method of forming a surface-infused gel layer with a spraying system comprising:
forming a liquid gel mixture comprising at least one flexible polymeric carrier in parachlorobenzotrifluoride (PCBTF) and comprising at least one microencapsulated phase change material (MPCM); and
spray coating a layering substrate with the liquid gel material to give a surface-infused gel layer on the layering substrate; and
evaporating the PCBTF from the surface-infused gel layer to cure flexible polymeric carrier.

16. The method of claim 15 further comprising compressing the layering substrate in the range of from about 0.1% to about 90%.

17. The method of claim 15 where the at least one flexible polymeric carrier is a gelatinous A-B-A tri-block copolymer elastomer that comprises an A-B-A tri-block copolymer resin selected from the group consisting of styrene-ethylene-butylene-styrene (SEBS), styrene-ethylene-propylene-styrene (SEPS), styrene-ethylene-ethylene-propylene-styrene (SEEPS), styrene-butadiene-styrene (SBS), styrene-isoprene-styrene (SIS) and combinations thereof.

18. The method of claim 15 where the liquid gel mixture further comprises:
a highly thermally-conductive material in the range of about 0.1% to about 95% by weight of the at least one cured flexible gel polymeric carrier layer after solvent loss; and
the highly thermally-conductive material is in solid form and has a thermal conductivity from about 100 W/(m-° K) to about 3500 W/(m-° K).

19. The method of claim 15 where the MPCM has a solid/liquid phase transition temperature from about 20° C. to about 35° C. and where the MPCM is present in the liquid gel mixture in the range of about 5% to about 80% by weight of the liquid gel mixture after solvent loss.

20. The method of claim 15 where the layering substrate is selected from the group consisting of open-celled polyether polyurethane foam, partially open-celled polyether polyurethane foam, reticulated polyurethane foam, high-resiliency polyether polyurethane foam, open-celled viscoelastic polyether polyurethane foam, partially open-celled viscoelastic polyether polyurethane foam, open-celled polyester polyurethane foam, partially open-celled polyester polyurethane foam, open-celled polyester foam, partially open-celled polyester foam, latex foam, melamine foam, and combinations thereof.

\* \* \* \* \*